US011184139B2

(12) United States Patent
Li et al.

(10) Patent No.: US 11,184,139 B2
(45) Date of Patent: Nov. 23, 2021

(54) RESOURCE CONFIGURATION METHOD, METHOD FOR DETERMINING BANDWIDTH PART, METHOD FOR INDICATING BANDWIDTH PART, AND DEVICE

(71) Applicant: HUAWEI TECHNOLOGIES CO., LTD., Guangdong (CN)

(72) Inventors: Xinxian Li, Shanghai (CN); Wenwen Huang, Shanghai (CN); Hao Tang, Shanghai (CN); Zhenfei Tang, Ottawa (CA); Zhongfeng Li, Munich (DE); Guohua Zhou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 64 days.

(21) Appl. No.: 16/580,927

(22) Filed: Sep. 24, 2019

(65) Prior Publication Data
US 2020/0021420 A1    Jan. 16, 2020

Related U.S. Application Data

(63) Continuation of application No. PCT/CN2018/080331, filed on Mar. 23, 2018.

(30) Foreign Application Priority Data

Mar. 25, 2017    (CN) .......................... 201710184953.1

(51) Int. Cl.
*H04L 5/00* (2006.01)
*H04W 24/02* (2009.01)
(Continued)

(52) U.S. Cl.
CPC .......... *H04L 5/0092* (2013.01); *H04L 5/0007* (2013.01); *H04L 5/0094* (2013.01); *H04W 56/001* (2013.01)

(58) Field of Classification Search
None
See application file for complete search history.

(56) References Cited

U.S. PATENT DOCUMENTS 9,131,489 B2 *  9/2015  Feng ..................... H04L 5/0064
2008/0095108 A1 *  4/2008  Malladi ................. H04B 1/713
370/329
(Continued)

FOREIGN PATENT DOCUMENTS

CN      101473619 A      7/2009
CN      101615984 A      12/2009
(Continued)

OTHER PUBLICATIONS

SAMSUNG: "Resource Aiiocation Aspects",3GPP Draft; R1-1705399, Mar. 24, 2017, total 6 pages.
(Continued)

*Primary Examiner* — Duc T Duong
(74) *Attorney, Agent, or Firm* — Womble Bond Dickinson (US) LLP

(57) ABSTRACT

This application discloses a resource configuration method, a method for determining a bandwidth part, a method for indicating a bandwidth part, and a device. The method for indicating a bandwidth part includes: determining, by a base station, the bandwidth part based on a mapping relationship between a first carrier bandwidth and a first bandwidth part set and/or a mapping relationship between a capability bandwidth of a terminal device and a second bandwidth part set, where the first bandwidth part set includes a plurality of bandwidth parts, the first bandwidth part set includes the bandwidth part, the second bandwidth part set includes a plurality of bandwidth parts, and the second bandwidth part set includes the bandwidth part; and indicating, by the base station, the bandwidth part to the terminal device.

20 Claims, 13 Drawing Sheets

(51) Int. Cl.
*H04W 24/04* (2009.01)
*H04W 72/04* (2009.01)
*H04W 56/00* (2009.01)

(56) References Cited

U.S. PATENT DOCUMENTS

| | | | |
|---|---|---|---|
| 2009/0191910 A1* | 7/2009 | Athalye | H04W 52/246 455/522 |
| 2009/0264077 A1 | 10/2009 | Damnjanovic | |
| 2011/0032888 A1* | 2/2011 | Matsumoto | H04L 5/0057 370/329 |
| 2012/0008589 A1* | 1/2012 | Iwai | H04W 72/0453 370/329 |
| 2012/0014330 A1 | 1/2012 | Damnjanovic et al. | |
| 2012/0275428 A1* | 11/2012 | Feng | H04L 5/0064 370/330 |
| 2015/0256403 A1* | 9/2015 | Li | H04L 27/2602 370/235 |
| 2016/0050662 A1* | 2/2016 | Baldemair | H04L 5/0053 370/329 |
| 2016/0081084 A1* | 3/2016 | Blankenship | H04W 72/0446 370/329 |
| 2016/0135214 A1* | 5/2016 | Chendamarai Kannan | H04W 72/1284 370/280 |
| 2016/0249327 A1* | 8/2016 | Chen | H04L 5/0039 |
| 2017/0135105 A1 | 5/2017 | Li et al. | |
| 2017/0164350 A1* | 6/2017 | Sun | H04L 5/0007 |
| 2017/0188347 A1* | 6/2017 | Chen | H04W 72/044 |
| 2017/0325237 A1* | 11/2017 | Sun | H04W 72/042 |
| 2018/0049169 A1* | 2/2018 | Lin | H04L 5/0051 |
| 2018/0124744 A1* | 5/2018 | Xue | H04W 72/005 |
| 2018/0219598 A1* | 8/2018 | Kim | H04B 7/0626 |
| 2018/0234227 A1* | 8/2018 | Zhang | H04L 5/0064 |
| 2019/0103931 A1* | 4/2019 | Yi | H04B 7/0639 |
| 2019/0109695 A1* | 4/2019 | Kim | H04L 27/2613 |
| 2019/0159153 A1* | 5/2019 | Li | H04W 56/0025 |
| 2019/0229867 A1* | 7/2019 | Yi | H04L 5/0048 |
| 2019/0260530 A1* | 8/2019 | Yi | H04L 5/0039 |
| 2020/0037323 A1* | 1/2020 | Song | H04L 5/003 |

FOREIGN PATENT DOCUMENTS

| | | |
|---|---|---|
| CN | 102148666 A | 8/2011 |
| CN | 102291731 A | 12/2011 |
| CN | 102668673 A | 9/2012 |
| CN | 103825670 A | 5/2014 |
| CN | 104703269 A | 6/2015 |
| WO | 2015169037 A1 | 11/2015 |

OTHER PUBLICATIONS

Guangdong OPPO Mobile TELECOM: "DL resource allocation and indication for NR",3GPP Draft R1-1704629, Mar. 24, 2017, total 4 pages.

Interdigital Communications: "Bandwidth adaptation in NR",3GPP Draft; R1-1705444, Mar. 24, 2017, total 6 pages.

Intel Corporation: "Wide bandwidth operation and UE capability",3GPP Draft; R1-1700389, Jan. 16, 2017, total 4 pages.

MCC Support,"Final Report of 3GPP TSG RAN WG1 #88 v1.0. 0",3GPP TSG RAN WG1 Meeting #88bis R1-1704172, Spokane, USA, Apr. 3-7, 2017,total 153 pages.

* cited by examiner

RESOURCE CONFIGURATION METHOD, METHOD FOR DETERMINING BANDWIDTH PART, METHOD FOR INDICATING BANDWIDTH PART, AND DEVICE

CROSS-REFERENCE TO RELATED APPLICATIONS

This application is a continuation of International Application No. PCT/CN2018/080331, filed on Mar. 23, 2018, which claims priority to Chinese Patent Application No. 201710184953.1, filed on Mar. 25, 2017. The disclosures of the aforementioned applications are hereby incorporated by reference in their entireties.

TECHNICAL FIELD

Embodiments of this application relate to the field of data communications technologies, and in particular, to a resource configuration method, a method for determining a bandwidth part, a method for indicating a bandwidth part, and a device.

BACKGROUND

A long term evolution (LTE) system standard carried out by the third generation partnership project (3GPP) is considered as a fourth-generation radio access system standard. In an existing LTE system, a basic unit in frequency domain is a subcarrier. Both uplink and downlink subcarrier spacings are 15 kHz. In LTE, an eNodeB configures a system bandwidth by using a MIB. The system bandwidth may be understood as a carrier bandwidth. Both the eNodeB and UE can transmit data on a full bandwidth of the carrier bandwidth.

As scenarios and services in a communications system diversify, in a next-generation communications system, for example, a new radio (NR) system, which is also referred to as a fifth-generation (5G) radio access system, a plurality of subcarrier spacings are introduced. That is, a piece of user equipment can support a plurality of subcarrier spacings, and different pieces of user equipment can use different or same subcarrier spacings. For a carrier bandwidth having a plurality of subcarrier spacings, how to configure a resource, how to determine a bandwidth part, and how to indicate the bandwidth part are problems urgently needing to be resolved at present.

SUMMARY

Embodiments of this application provide a resource configuration method, a method for determining a bandwidth part, a method for indicating a bandwidth part, and a device, to indicate a bandwidth part.

According to a first aspect, a resource configuration method is provided. The method may be applied to a base station. In the method, the base station determines, based on mapping relationships between carrier bandwidths and subcarrier spacings, a first subcarrier spacing used for resource configuration in a first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing; and then, the base station configures a resource for a terminal device based on the determined first subcarrier spacing.

In this embodiment of this application, the base station pre-configures the mapping relationships between carrier bandwidths and subcarrier spacings, where the mapping relationships include a plurality of different subcarrier spacings. The base station may select an appropriate subcarrier spacing based on a carrier bandwidth, to configure a resource. Assuming that the carrier bandwidth of the base station is the first carrier bandwidth, the base station determines, based on the pre-configured mapping relationships, a subcarrier spacing used for resource configuration in the first carrier bandwidth. This avoids a signaling overhead problem caused by using a small subcarrier spacing to configure a resource in a case of a large carrier bandwidth, thereby reducing signaling overheads required for the resource configuration.

Further, a subcarrier spacing used when the terminal device configures a resource may be implicitly or explicitly indicated by binding a carrier bandwidth with the subcarrier spacing used when the resource is configured.

In one embodiment, the first carrier bandwidth belongs to a first carrier bandwidth range, and a subcarrier spacing used for resource configuration in each carrier bandwidth included in the first carrier bandwidth range is the first subcarrier spacing.

In this embodiment of this application, the mapping relationships between carrier bandwidths and subcarrier spacings may be a mapping relationship between one carrier bandwidth range and one subcarrier spacing, where the carrier bandwidth range includes a plurality of carrier bandwidths. Alternatively, the mapping relationships between carrier bandwidths and subcarrier spacings may be a mapping relationship between one carrier bandwidth and one subcarrier spacing.

In one embodiment, the first carrier bandwidth can support a plurality of subcarrier spacings, and the plurality of subcarrier spacings include the first subcarrier spacing.

In this embodiment of this application, a given carrier bandwidth supports a finite set of subcarrier spacings. In this way, the mapping relationships between carrier bandwidths and subcarrier spacings may be that one carrier bandwidth corresponds to one subcarrier spacing set. When determining a subcarrier spacing, the base station may determine the subcarrier spacing in a corresponding subcarrier spacing set based on an actual situation, for example, to minimum signaling overheads, select a maximum subcarrier spacing from the subcarrier spacing set; or select an appropriate subcarrier spacing based on an actual service type, thereby flexibly configuring the subcarrier spacing.

According to a second aspect, a method for determining a bandwidth part is provided. The method may be applied to a base station. In the method, the base station determines the bandwidth part based on a mapping relationship between a first carrier bandwidth and a first bandwidth part set and/or a mapping relationship between a capability bandwidth of a terminal device and a second bandwidth part set, where the first bandwidth part set includes a plurality of bandwidth parts, the plurality of bandwidth parts included in the first bandwidth part set include the bandwidth part determined by the base station, the second bandwidth part set includes a plurality of bandwidth parts, and the plurality of bandwidth parts included in the second bandwidth part set include the bandwidth part determined by the base station; and after determining the bandwidth part, the base station sends first indication information to the terminal device, where the first indication information is used to indicate the bandwidth part determined by the base station.

In this embodiment of this application, the base station pre-configures mapping relationships between carrier bandwidths and bandwidth part sets and/or mapping relationships between capability bandwidths of terminal devices and bandwidth part sets. The mapping relationships may include the mapping relationships between carrier bandwidths and bandwidth part sets, the mapping relationships between capability bandwidths of terminal devices and bandwidth part sets, or a combination thereof. The mapping relationships between carrier bandwidths and bandwidth part sets include a plurality of carrier bandwidths, and each carrier bandwidth corresponds to one bandwidth part set. The mapping relationships between capability bandwidths of terminal devices and bandwidth part sets include capability bandwidths of a plurality of terminal devices, where a capability bandwidth of each terminal device corresponds to one bandwidth part set. The bandwidth part set includes a plurality of bandwidth parts. In this way, a plurality of bandwidth parts are pre-configured for different carrier bandwidths and capability bandwidths of different terminal devices. When determining a bandwidth part, the base station determines the bandwidth part based on the pre-configured mapping relationships. This resolves a problem of adaptively selecting a bandwidth part based on a different carrier bandwidth or a different UE capability, and improves flexibility of determining a bandwidth part of a terminal device.

Further, when determining a bandwidth part, the base station can determine the bandwidth part in a plurality of bandwidth parts, facilitating adaptive adjustment of a bandwidth part by the base station based on an actual requirement, for example, adjustment of a bandwidth part based on a different service type.

In one embodiment, the method further includes: receiving, by the base station, second indication information sent by the terminal device, where the second indication information is used to indicate the capability bandwidth of the terminal device. The capability bandwidth of the terminal device indicates a maximum bandwidth part that can be supported by the terminal device.

In this embodiment of this application, the base station may obtain, by using RRC signaling after establishing an RRC connection to the terminal device, the capability bandwidth that can be supported by the terminal device, or obtain, in a random access process established with the terminal device, the capability bandwidth that can be supported by the terminal device, and then indicate the bandwidth part in different manners based on the different obtaining manners. For example, if the base station obtains the capability bandwidth of the terminal device by using preamble information sent by the terminal device, the base station may indicate the determined bandwidth part by using an RAR; or if the base station obtains the capability bandwidth of the terminal device by using Msg3 in the random access process, the base station may indicate the determined bandwidth part by using Msg4. In this way, the base station can flexibly adjust an indication manner.

In one embodiment, the determining, by the base station, the bandwidth part of a terminal device based on a mapping relationship between a first carrier bandwidth and a first bandwidth part set includes: determining, by the base station, the bandwidth part of the terminal device in the first bandwidth part set, where the bandwidth part of the terminal device is less than or equal to the smaller one of the capability bandwidth of the terminal device and the first carrier bandwidth.

In this embodiment of this application, the base station configures only the mapping relationships between carrier bandwidths and bandwidth part sets. Assuming that a carrier bandwidth of the base station is the first carrier bandwidth, the base station determines, based on the capability bandwidth of the terminal device, the bandwidth part of the terminal device in a plurality of first bandwidth parts corresponding to the first carrier bandwidth. In this way, the bandwidth part of the terminal device can match the carrier bandwidth and the capability of the terminal device.

In one embodiment, the determining, by the base station, the bandwidth part of a terminal device based on a mapping relationship between a capability bandwidth of the terminal device and a second bandwidth part set includes: determining, by the base station, any bandwidth part in the second bandwidth part set as the bandwidth part of the terminal device.

In one embodiment, if the base station configures only the mapping relationships between capability bandwidths of terminal devices and bandwidth part sets, assuming that a bandwidth part set corresponding to the capability bandwidth of the terminal device is the second bandwidth part set, the base station may select any bandwidth part from the second bandwidth part set as the bandwidth part of the terminal device. In this way, the bandwidth part of the terminal device can match the capability of the terminal device.

In one embodiment, the sending, by the base station, first indication information to the terminal device includes: sending, by the base station, third indication information to the terminal device, where the third indication information is used to indicate a frequency domain position of the bandwidth part in the first carrier bandwidth to the terminal device, and the bandwidth part includes a plurality of bandwidth part units; and sending, by the base station, fourth indication information to the terminal device, where the fourth indication information is used to indicate a frequency domain position of a scheduled physical resource block in the bandwidth part.

In this embodiment of this application, after determining the bandwidth part configured for the terminal device, the base station sends the third indication information and the fourth indication information to the terminal device, where the third indication information is used to indicate the frequency domain position of the bandwidth part of the terminal device in the carrier bandwidth. However, when transmitting data to the terminal device, the base station may not use all of the bandwidth part. Therefore, the fourth indication information is further needed to indicate the frequency domain position of the scheduled physical resource block in the bandwidth part. The third indication information and the fourth indication information may be included in same signaling, or may be sent separately. If the bandwidth part is consecutively distributed in the frequency domain position in the carrier bandwidth, the third indication information may be an RIV value or a valid value of each frequency domain position in a bitmap manner. If the bandwidth part is non-consecutively distributed in the frequency domain position in the carrier bandwidth, the third indication information may be an r value in a manner in an uplink resource allocation type 1 or a valid value of each frequency domain position in a bitmap manner. In this way, the bandwidth part of the terminal device includes several bandwidth part units, and the bandwidth part is flexibly indicated by using the bandwidth part units.

In one embodiment, the bandwidth part unit is a resource block group (RBG), a synchronization signal bandwidth (SS bandwidth), or a physical resource block (PRB).

In this embodiment of this application, the bandwidth part unit may be determined based on an actual situation. For example, in a two-level user resource allocation indication method, when a scheduled resource block in the bandwidth part is indicated, a resource block group is used as a scheduling unit. Therefore, to be better compatible with the second operation of the resource allocation, a resource block group is selected as the bandwidth part unit, thereby obtaining different degrees of flexibility by using different bandwidth part units.

In one embodiment, the third indication information is carried in a resource in a common search space of a control channel or a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space. The sending, by the base station, third indication information to the terminal device includes: sending, by the base station in a first time domain position, the third indication information to the terminal device by using the control channel. After the sending, by the base station, third indication information to the terminal device, the method further includes: sending, by the base station in a second time domain position, data to the terminal device by using the determined bandwidth part.

In this embodiment of this application, the frequency domain position indicated in the third indication information may not overlap with the position of the resource in the common search space or the position of the resource in the UE specific search space. In this way, the frequency domain position for sending the third indication information is different from a frequency domain position in which the terminal device actually receives data. When receiving the data sent by the base station, the terminal device needs to switch the frequency domain position. To ensure that the terminal device correctly receives the data sent by the base station, the base station sends the data to the terminal device in a time domain position after a time domain position for sending the third indication information. Therefore, it can be effectively ensured that the terminal receives data in a time domain position in which the base station sends the data, thereby ensuring integrity of the received data.

In one embodiment, the fourth indication information is carried on the resource in the common search space of the control channel or the resource in the terminal device specific search space, the frequency domain position of the bandwidth part in the first carrier bandwidth does not overlap with the frequency domain position, in the first carrier bandwidth, of the resource in the common search space, and the frequency domain position of the bandwidth part in the first carrier bandwidth does not overlap with the frequency domain position, in the first carrier bandwidth, of the resource in the terminal device specific search space. The sending, by the base station, fourth indication information to the terminal device includes: sending, by the base station in the first time domain position, the fourth indication information to the terminal device by using the control channel. After the sending, by the base station, fourth indication information to the terminal device, the method further includes: sending, by the base station in the second time domain position, data to the terminal device by using the determined bandwidth part.

In this embodiment of this application, the frequency domain position indicated in the fourth indication information may not overlap with the position of the resource in the common search space or the position of the resource in the UE specific search space. In this way, the frequency domain position for sending the fourth indication information is different from a frequency domain position in which the terminal device actually receives data. When receiving the data sent by the base station, the terminal device needs to switch the frequency domain position. To ensure that the terminal device correctly receives the data sent by the base station, the base station sends the data to the terminal device in a time domain position after a time domain position for sending the fourth indication information. Therefore, it can be effectively ensured that the terminal receives data in a time domain position in which the base station sends the data, thereby ensuring integrity of the received data.

In one embodiment, the first time domain position and the second time domain position are in one scheduling unit in time domain, and the last orthogonal frequency division multiplexing (OFDM) symbol included in the first time domain position and the first OFDM symbol included in the second time domain position are separated by M OFDM symbols, where M is an integer greater than or equal to 1.

In this embodiment of this application, a time domain position difference between the first time domain position in which the base station sends the second indication information and the second time domain position in which the base station sends the data may be set to one or more OFDM symbols, for example, two symbols. In this way, after determining a quantity of symbols occupied by the resource in the common search space or the resource in the UE specific search space in time domain, the base station can accurately determine a start position of a data channel in time domain, thereby improving accuracy of data exchange between the base station and the terminal device.

In one embodiment, before the sending, by the base station, first indication information to the terminal device, the method further includes: determining, by the base station based on mapping relationships between carrier bandwidths and subcarrier spacings, a first subcarrier spacing used for resource configuration in the first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing; and determining, by the base station based on the determined first subcarrier spacing, the frequency domain position of the bandwidth part of the terminal device in the first carrier bandwidth.

In this embodiment of this application, the base station pre-configures the mapping relationships between carrier bandwidths and subcarrier spacings, where the mapping relationships include a plurality of different subcarrier spacings. For a plurality of base stations having different carrier bandwidths, each base station may select an appropriate subcarrier spacing based on the carrier bandwidth of the base station, to configure a resource. This avoids a signaling overhead problem caused by using a small subcarrier spacing to configure a resource in a case of a large carrier bandwidth, thereby reducing signaling overheads during the resource configuration.

Further, a subcarrier spacing used when the terminal device determines the frequency domain position may be implicitly indicated by binding a carrier bandwidth with a subcarrier spacing used when a resource is configured.

In one embodiment, the first carrier bandwidth belongs to a first carrier bandwidth range, and a subcarrier spacing used for resource configuration in each carrier bandwidth included in the first carrier bandwidth range is the first subcarrier spacing.

In this embodiment of this application, the mapping relationships between carrier bandwidths and subcarrier spacings may be a mapping relationship between one carrier bandwidth range and one subcarrier spacing, where the carrier bandwidth range includes a plurality of carrier bandwidths, thereby reducing an information amount of the mapping relationship, and reducing load of the base station.

In one embodiment, the first carrier bandwidth can support a plurality of subcarrier spacings, and the plurality of subcarrier spacings include the first subcarrier spacing.

In this embodiment of this application, a given carrier bandwidth supports a finite set of subcarrier spacings. In this way, the mapping relationships between carrier bandwidths and subcarrier spacings may be that one carrier bandwidth corresponds to one subcarrier spacing set. When determining a subcarrier spacing, the base station may determine the subcarrier spacing in a corresponding subcarrier spacing set based on an actual situation, for example, to minimum signaling overheads, select a maximum subcarrier spacing from the subcarrier spacing set; or select an appropriate subcarrier spacing based on an actual service type, thereby flexibly configuring the subcarrier spacing.

According to a third aspect, a method for indicating a bandwidth part is provided. The method may be applied to a base station. In the method, after determining a bandwidth part of a terminal device, the base station sends first indication information to the terminal device, where the first indication information is used to indicate a frequency domain position of the determined bandwidth part in a first carrier bandwidth to the terminal device, where the bandwidth part includes a plurality of bandwidth part units; and then, the base station sends second indication information to the terminal device, where the second indication information is used to indicate a frequency domain position of a scheduled physical resource block in the bandwidth part.

In this embodiment of this application, the base station may determine the bandwidth part of the terminal device based on a preset bandwidth value or based on mapping relationships between carrier bandwidths and bandwidth part sets and/or mapping relationships between capability bandwidths of terminal devices and bandwidth part sets. After determining the bandwidth part configured for the terminal device, the base station sends the first indication information and the second indication information to the terminal device, where the first indication information is used to indicate a series of bits for a frequency domain position of the bandwidth part of the terminal device in a carrier bandwidth, but the bandwidth part may not be completely used. Therefore, the second indication information is further needed to indicate a frequency domain position, in the bandwidth part, of a physical resource block for transmitting data by the base station to the terminal device. The first indication information and the second indication information may be included in same signaling, or may be sent separately. The first indication information may be an RIV value or a valid value of each frequency domain position in a bitmap manner, so that the bandwidth part is consecutively distributed in the frequency domain position in the carrier bandwidth. The first indication information may be an r value in a manner in an uplink resource allocation type 1 or a valid value of each frequency domain position in a bitmap manner, so that the bandwidth part is non-consecutively distributed in the frequency domain position in the carrier bandwidth. In this way, the bandwidth part of the terminal device includes several bandwidth part units, and the bandwidth part is flexibly indicated by using the bandwidth part units.

In one embodiment, the bandwidth part unit is a resource block group (RBG), a synchronization signal bandwidth (SS bandwidth), or a physical resource block (PRB).

In this embodiment of this application, the bandwidth part unit may be determined based on an actual situation. For example, in a two-level user resource allocation indication method, when a scheduled resource block in the bandwidth part is indicated, a resource block group is used as a scheduling unit. Therefore, to be better compatible with the second operation of the resource allocation, a resource block group is selected as the bandwidth part unit, thereby obtaining different degrees of flexibility by using different bandwidth part units.

In one embodiment, the first indication information is carried on the resource in the common search space of the control channel or the resource in the terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space. The sending, by the base station, first indication information to the terminal device includes: sending, by the base station in a first time domain position, the first indication information to the terminal device by using the control channel. After the sending, by the base station, first indication information to the terminal device, the method further includes: sending, by the base station in a second time domain position, data to the terminal device by using the determined bandwidth part.

In this embodiment of this application, the frequency domain position indicated in the first indication information may not overlap with a position of the resource in the common search space of the control channel or a position of the resource in the UE specific search space. In this way, the frequency domain position for sending the first indication information is different from a frequency domain position in which the terminal device actually receives data. When receiving the data sent by the base station, the terminal device needs to switch the frequency domain position. To ensure that the terminal device correctly receives the data sent by the base station, the base station sends the data to the terminal device in a time domain position after a time domain position for sending the first indication information. Therefore, it can be effectively ensured that the terminal receives data in a time domain position in which the base station sends the data, thereby ensuring integrity of the received data.

In one embodiment, the second indication information is carried on the resource in the common search space of the control channel or the resource in the terminal device specific search space, the frequency domain position of the bandwidth part in the first carrier bandwidth does not overlap with the frequency domain position, in the first carrier bandwidth, of the resource in the common search space, and the frequency domain position of the bandwidth part in the first carrier bandwidth does not overlap with the frequency domain position, in the first carrier bandwidth, of the resource in the terminal device specific search space. The sending, by the base station, second indication information to the terminal device includes: sending, by the base station in the first time domain position, the second indication information to the terminal device by using the control channel. After the sending, by the base station, second indication information to the terminal device, the method further includes: sending, by the base station in the second time domain position, data to the terminal device by using the determined bandwidth part.

In this embodiment of this application, the frequency domain position indicated in the second indication information may not overlap with the position of the resource in the common search space of the control channel or the position of the resource in the UE specific search space. In this way, the frequency domain position for sending the second indication information is different from a frequency domain position in which the terminal device actually receives data. When receiving the data sent by the base station, the terminal device needs to switch the frequency domain position. To ensure that the terminal device correctly receives the data sent by the base station, the base station sends the data to the terminal device in a time domain position after a time domain position for sending the second indication information. Therefore, it can be effectively ensured that the terminal receives data in a time domain position in which the base station sends the data, thereby ensuring integrity of the received data.

In one embodiment, the first time domain position and the second time domain position are in one scheduling unit in time domain, and the last OFDM symbol included in the first time domain position and the first OFDM symbol included in the second time domain position are separated by M OFDM symbols, where M is an integer greater than or equal to 1.

In this embodiment of this application, a time domain position difference between the first time domain position in which the base station sends the second indication information and the second time domain position in which the base station sends the data may be set to one or more OFDM symbols, for example, two symbols. In this way, after determining a quantity of symbols occupied by the position of the resource in the common search space or the position of the resource in the UE specific search space in time domain, the base station can accurately determine a start position of a data channel in time domain, thereby improving accuracy of data exchange between the base station and the terminal device.

In one embodiment, before the sending, by the base station, first indication information to the terminal device, the method further includes: determining, by the base station, the bandwidth part of the terminal device based on a mapping relationship between the first carrier bandwidth and a first bandwidth part set and/or a mapping relationship between a capability bandwidth of the terminal device and a second bandwidth part set, where the first bandwidth part set includes a plurality of bandwidth parts, the first bandwidth part set includes the determined bandwidth part, the second bandwidth part set includes a plurality of bandwidth parts, and the second bandwidth part set includes the determined bandwidth part.

In this embodiment of this application, the base station pre-configures mapping relationships between carrier bandwidths and bandwidth part sets and/or mapping relationships between capability bandwidths of terminal devices and bandwidth part sets. The mapping relationships configured by the base station may include the mapping relationships between carrier bandwidths and bandwidth part sets, the mapping relationships between capability bandwidths of terminal devices and bandwidth part sets, or a combination thereof. The mapping relationships between carrier bandwidths and bandwidth part sets include a plurality of carrier bandwidths, and each carrier bandwidth corresponds to one bandwidth part set. The mapping relationships between capability bandwidths of terminal devices and bandwidth part sets include capability bandwidths of a plurality of terminal devices, where a capability bandwidth of each terminal device corresponds to one bandwidth part set. The bandwidth part set includes a plurality of bandwidth parts. In this way, a plurality of bandwidth parts are pre-configured for different carrier bandwidths and capability bandwidths of different terminal devices. When determining a bandwidth part, the base station determines the bandwidth part based on the pre-configured mapping relationships bandwidth part. This resolves a problem of adaptively selecting a bandwidth part based on a different carrier bandwidth or a different UE capability, and improves flexibility of determining a bandwidth part of a terminal device.

Further, when determining a bandwidth part, the base station can determine the bandwidth part in a plurality of bandwidth parts, facilitating adaptive adjustment of a bandwidth part by the base station based on an actual requirement, for example, adjustment of a bandwidth part based on a different service type.

In one embodiment, before the determining, by the base station, the bandwidth part, the method further includes: receiving, by the base station, third indication information sent by the terminal device, where the third indication information is used to indicate the capability bandwidth of the terminal device.

In this embodiment of this application, the base station may obtain the capability bandwidth of the terminal device by using RRC signaling after establishing an RRC connection to the terminal device, or obtain the capability bandwidth of the terminal device in a random access process established with the terminal device, and then indicate the bandwidth part in different manners based on the different obtaining manners. For example, if the base station obtains the capability bandwidth of the terminal device by using preamble information sent by the terminal device, the base station may indicate the determined bandwidth part by using an RAR; or if the base station obtains the capability bandwidth of the terminal device by using Msg3 in the random access process, the base station may indicate the determined bandwidth part by using Msg4. In this way, the base station can flexibly adjust an indication manner.

In one embodiment, the determining, by the base station, the bandwidth part of the terminal device based on a mapping relationship between the first carrier bandwidth and a first bandwidth part set includes: determining, by the base station, the bandwidth part of the terminal device in the first bandwidth part set, where the bandwidth part is less than or equal to the capability bandwidth of the terminal device.

In this embodiment of this application, the base station configures only the mapping relationships between carrier bandwidths and bandwidth part sets. Assuming that a carrier bandwidth of the base station is the first carrier bandwidth, the base station determines, based on the capability bandwidth of the terminal device, the bandwidth part of the terminal device in a plurality of first bandwidth parts corresponding to the first carrier bandwidth. In this way, the bandwidth part of the terminal device can match the carrier bandwidth and the capability of the terminal device.

In one embodiment, the determining, by the base station, the bandwidth part of the terminal device based on a mapping relationship between a capability bandwidth of the terminal device and a second bandwidth part set includes: determining, by the base station, any bandwidth part in the second bandwidth part set as the bandwidth part of the terminal device.

In one embodiment, if the base station configures only the mapping relationships between capability bandwidths of terminal devices and bandwidth part sets, assuming that a bandwidth part set corresponding to the capability bandwidth of the terminal device is the second bandwidth part set, the base station may select any bandwidth part from the second bandwidth part set as the bandwidth part of the terminal device. In this way, the bandwidth part of the terminal device can match the capability of the terminal device.

In one embodiment, the method further includes: determining, by the base station based on mapping relationships between carrier bandwidths and subcarrier spacings, a first subcarrier spacing used for resource configuration in the first carrier bandwidth, where the mapping relationships include a mapping relationship between the first carrier bandwidth and the first subcarrier spacing and a mapping relationship between a second carrier bandwidth and a second subcarrier spacing, and the first subcarrier spacing is different from the second subcarrier spacing; and determining, by the base station, the frequency domain position of the bandwidth part in the first carrier bandwidth based on the determined first subcarrier spacing.

In this embodiment of this application, the base station pre-configures the mapping relationships between carrier bandwidths and subcarrier spacings, where the mapping relationships include a plurality of different subcarrier spacings. For a plurality of base stations having different carrier bandwidths, each base station may select an appropriate subcarrier spacing based on the carrier bandwidth of the base station, to configure a resource. This avoids a signaling overhead problem caused by using a small subcarrier spacing to configure a resource in a case of a large carrier bandwidth, thereby reducing signaling overheads during the resource configuration.

Further, a subcarrier spacing used when the terminal device configures a resource may be implicitly indicated by binding a carrier bandwidth with the subcarrier spacing used when the resource is configured.

In one embodiment, the first carrier bandwidth belongs to a first carrier bandwidth range, and a subcarrier spacing used for resource configuration in each carrier bandwidth included in the first carrier bandwidth range is the first subcarrier spacing.

In this embodiment of this application, the mapping relationships between carrier bandwidths and subcarrier spacings may be a mapping relationship between one carrier bandwidth range and one subcarrier spacing, where the carrier bandwidth range includes a plurality of carrier bandwidths, thereby reducing an information amount of the mapping relationship, and reducing load of the base station.

In one embodiment, the first carrier bandwidth can support a plurality of subcarrier spacings, and the plurality of subcarrier spacings include the first subcarrier spacing.

In this embodiment of this application, a given carrier bandwidth supports a finite set of subcarrier spacings. In this way, the mapping relationships between carrier bandwidths and subcarrier spacings may be that one carrier bandwidth corresponds to one subcarrier spacing set. When determining a subcarrier spacing, the base station may determine the subcarrier spacing in a corresponding subcarrier spacing set based on an actual situation, for example, to minimum signaling overheads, select a maximum subcarrier spacing from the subcarrier spacing set; or select an appropriate subcarrier spacing based on an actual service type, thereby flexibly configuring the subcarrier spacing.

According to a fourth aspect, a resource configuration method is provided. The method may be applied to a terminal device. In the method, the terminal device determines, based on mapping relationships between carrier bandwidths and subcarrier spacings, a first subcarrier spacing used for resource configuration in a first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, the first subcarrier spacing is different from the second subcarrier spacing, and the first carrier bandwidth is a carrier bandwidth indicated by a base station to the terminal device; and then, the terminal device determines, based on the determined first subcarrier spacing, a position of a resource allocated by the base station to the terminal device.

In this embodiment of this application, the terminal device pre-configures the mapping relationships between carrier bandwidths and subcarrier spacings, where the mapping relationships include a plurality of different subcarrier spacings. For a plurality of base stations having different carrier bandwidths, each base station may select an appropriate subcarrier spacing based on a carrier bandwidth of the base station, to configure a resource. Assuming that the carrier bandwidth of the base station is the first carrier bandwidth, the terminal device determines, based on the pre-configured mapping relationships, a subcarrier spacing used for resource configuration in the first carrier bandwidth. This avoids a signaling overhead problem caused by using a small subcarrier spacing to configure a resource in a case of a large carrier bandwidth, thereby reducing signaling overheads required for the resource configuration.

Further, the terminal device may implicitly indicate, by binding a carrier bandwidth with a subcarrier spacing used when configuring a resource, the subcarrier spacing used when configuring the resource.

In one embodiment, the first carrier bandwidth belongs to a first carrier bandwidth range, and a subcarrier spacing used for resource configuration in each carrier bandwidth included in the first carrier bandwidth range is the first subcarrier spacing.

In this embodiment of this application, the mapping relationships between carrier bandwidths and subcarrier spacings may be a mapping relationship between one carrier bandwidth range and one subcarrier spacing, where the carrier bandwidth range includes a plurality of carrier bandwidths, thereby reducing an information amount of the mapping relationship, and reducing load of the terminal device.

In one embodiment, the first carrier bandwidth can support a plurality of subcarrier spacings, and the plurality of subcarrier spacings include the first subcarrier spacing.

In this embodiment of this application, a given carrier bandwidth supports a finite set of subcarrier spacings. In this way, the mapping relationships between carrier bandwidths and subcarrier spacings may be that one carrier bandwidth corresponds to one subcarrier spacing set. When determining a subcarrier spacing, the terminal device may determine the subcarrier spacing in a corresponding subcarrier spacing set based on an actual situation, for example, to minimum signaling overheads, select a maximum subcarrier spacing from the subcarrier spacing set; or select an appropriate subcarrier spacing based on an actual service type, thereby flexibly configuring the subcarrier spacing.

According to a fifth aspect, a method for determining a bandwidth part is provided. The method may be applied to a terminal device. In the method, the terminal device receives first indication information sent by a base station, where the first indication information is used to indicate a bandwidth part determined by the base station, and the bandwidth part determined by the base station is determined by the base station based on a mapping relationship between a first carrier bandwidth and a first bandwidth part set and/or a mapping relationship between a capability bandwidth of a terminal device and a second bandwidth part set, where the first bandwidth part set includes a plurality of bandwidth parts, the plurality of bandwidth parts included in the first bandwidth part set include the bandwidth part determined by the base station, the second bandwidth part set includes a plurality of bandwidth parts, the plurality of bandwidth parts included in the second bandwidth part set include the bandwidth part determined by the base station, and the first carrier bandwidth is a carrier bandwidth indicated by the base station to the terminal device; and then, the terminal device determines, according to the first indication information, the bandwidth part determined by the base station.

In this embodiment of this application, the terminal device determines the bandwidth part according to the indication information of the base station.

In one embodiment, before the receiving, by the terminal device, first indication information sent by a base station, the method further includes:

sending, by the terminal device to the base station, second indication information used to indicate the capability bandwidth of the terminal device.

In this embodiment of this application, after establishing an RRC connection to the base station, the terminal device may report the capability bandwidth of the terminal device, in one embodiment, a maximum bandwidth part that can be supported by the terminal device, by using RRC signaling, or report the capability bandwidth of the terminal device in a random access process established with the base station.

In one embodiment, the receiving, by the terminal device, first indication information sent by a base station includes:

receiving, by the terminal device, third indication information sent by the base station, where the third indication information is used to indicate a frequency domain position, in the first carrier bandwidth, of the bandwidth part determined by the base station, and the bandwidth part determined by the base station includes a plurality of bandwidth part units; and receiving, by the terminal device, fourth indication information sent by the base station, where the fourth indication information is used to indicate a frequency domain position of a scheduled physical resource block in the determined bandwidth part.

In this embodiment of this application, when determining the bandwidth part based on indication information sent by the base station, the terminal device obtains the third indication information and the fourth indication information from the base station, where the third indication information is used to indicate a series of bits for a frequency domain position of the bandwidth part of the terminal device in a carrier bandwidth, and the fourth indication information is further needed to indicate a frequency domain position of a physical resource block in the bandwidth part. The third indication information and the fourth indication information may be included in same signaling, or may be sent separately. If the bandwidth part is consecutively distributed in the frequency domain position in the carrier bandwidth, the third indication information may be an RIV value or a valid value of each frequency domain position in a bitmap manner. If the bandwidth part is non-consecutively distributed in the frequency domain position in the carrier bandwidth, the third indication information may be an r value in a manner in an uplink resource allocation type 1 or a valid value of each frequency domain position in a bitmap manner.

In one embodiment, the bandwidth part unit is a RBG, a SS bandwidth, or a PRB. However, this application is not limited thereto.

In this embodiment of this application, the bandwidth part unit may be determined based on an actual situation. For example, in a two-level user resource allocation indication, when a scheduled resource block in the bandwidth part is indicated, a resource block group is used as a scheduling unit. Therefore, to be better compatible with the second operation of the resource allocation, a resource block group is selected as the bandwidth part unit, thereby obtaining different degrees of flexibility by using different bandwidth part units.

In one embodiment, the third indication information is carried on a resource in a common search space of a control channel or a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space; and the receiving, by the terminal device, third indication information sent by the base station includes:

receiving, by the terminal device in a first time domain position by using the control channel, the third indication information sent by the base station; and after the receiving, by the terminal device, third indication information sent by the base station, the method further includes:

receiving, by the terminal device in a second time domain position by using the determined bandwidth part, data sent by the base station.

In this embodiment of this application, the frequency domain position indicated in the third indication information may not overlap with the position of the resource in the common search space or the position of the resource in the UE specific search space. In this way, the frequency domain position for sending the third indication information is different from a frequency domain position in which the terminal device actually receives data. When receiving the data sent by the base station, the terminal device needs to switch the frequency domain position. To ensure that the terminal device correctly receives the data sent by the base station, the base station sends the data to the terminal device in a time domain position after a time domain position for sending the third indication information. In this way, the terminal device receives, in the second time domain position, the data sent by the base station.

In one embodiment, the first time domain position and the second time domain position belong to one scheduling unit in time domain, and the last OFDM symbol included in the first time domain position and the first OFDM symbol included in the second time domain position are separated by M OFDM symbols, where M is an integer greater than or equal to 1.

In this embodiment of this application, a time domain position difference between the first time domain position for sending the second indication information and the second time domain position for sending the data may be set to one or more OFDM symbols, for example, two symbols. In this way, after determining a quantity of symbols occupied by the position of the resource in the common search space or the position of the resource in the UE specific search space in time domain, the terminal device can accurately determine a start position of a data channel in time domain, thereby improving accuracy of data exchange between the base station and the terminal device.

In one embodiment, the method further includes: determining, by the terminal device based on mapping relationships between carrier bandwidths and subcarrier spacings, a first subcarrier spacing used for resource configuration in the first carrier bandwidth, where the mapping relationships include a mapping relationship between the first carrier bandwidth and the first subcarrier spacing and a mapping relationship between a second carrier bandwidth and a second subcarrier spacing, and the first subcarrier spacing is different from the second subcarrier spacing; and determining, by the terminal device based on the determined first subcarrier spacing, the frequency domain position, in the first carrier bandwidth, of the bandwidth part determined by the base station.

In this embodiment of this application, the terminal device pre-configures the mapping relationships between carrier bandwidths and subcarrier spacings, where the mapping relationships include a plurality of different subcarrier spacings. For a plurality of base stations having different carrier bandwidths, each base station may select an appropriate subcarrier spacing based on a carrier bandwidth of the base station, to configure a resource. Assuming that the carrier bandwidth of the base station is the first carrier bandwidth, the terminal device determines, based on the pre-configured mapping relationships, a subcarrier spacing used for resource configuration in the first carrier bandwidth.

In one embodiment, the first carrier bandwidth belongs to a first carrier bandwidth range, and a subcarrier spacing used for resource configuration in each carrier bandwidth included in the first carrier bandwidth range is the first subcarrier spacing.

In this embodiment of this application, the mapping relationships between carrier bandwidths and subcarrier spacings may be a mapping relationship between one carrier bandwidth range and one subcarrier spacing, where the carrier bandwidth range includes a plurality of carrier bandwidths, thereby reducing an information amount of the mapping relationship, and reducing load of the terminal device.

In one embodiment, the first carrier bandwidth can support a plurality of subcarrier spacings, and the plurality of subcarrier spacings include the first subcarrier spacing.

In this embodiment of this application, a given carrier bandwidth supports a finite set of subcarrier spacings. In this way, the mapping relationships between carrier bandwidths and subcarrier spacings may be that one carrier bandwidth corresponds to one subcarrier spacing set. When determining a subcarrier spacing, the terminal device may determine the subcarrier spacing in a corresponding subcarrier spacing set based on an actual situation, for example, to minimum signaling overheads, select a maximum subcarrier spacing from the subcarrier spacing set; or select an appropriate subcarrier spacing based on an actual service type, thereby flexibly configuring the subcarrier spacing.

According to a sixth aspect, a method for indicating a bandwidth part is provided. The method may be applied to a terminal device. In the method, the terminal device receives first indication information sent by a base station, where the first indication information is used to indicate a frequency domain position, in a first carrier bandwidth, of a bandwidth part determined by the base station to the terminal device, the first carrier bandwidth is a carrier bandwidth indicated by the base station to the terminal device, and the bandwidth part includes one or more bandwidth part units; and the terminal device receives second indication information sent by the base station, where the second indication information is used to indicate a frequency domain position of a scheduled physical resource block in the bandwidth part.

In this embodiment of this application, when determining the bandwidth part based on indication information sent by the base station, the terminal device obtains the first indication information and the second indication information from the base station, where the first indication information is used to indicate a frequency domain position of the bandwidth part of the terminal device in a carrier bandwidth, and the second indication information indicates a frequency domain position of a physical resource block in the bandwidth part, where the physical resource block is used by the base station to transmit data to the terminal device. The first indication information and the second indication information may be included in same signaling, or may be sent separately. If the bandwidth part is consecutively distributed in the frequency domain position in the carrier bandwidth, the first indication information may be an RIV value or a valid value of each frequency domain position in a bitmap manner. If the bandwidth part is non-consecutively distributed in the frequency domain position in the carrier bandwidth, the first indication information may be an r value in a manner in an uplink resource allocation type 1.

In one embodiment, the bandwidth part unit is a resource block group, a synchronization signal bandwidth, or a physical resource block.

In this embodiment of this application, the bandwidth part unit may be determined based on an actual situation. For example, in a two-level user resource allocation indication method, when a scheduled resource block in the bandwidth part is indicated, a resource block group is used as a scheduling unit. Therefore, to be better compatible with the second operation of the resource allocation, a resource block group is selected as the bandwidth part unit, thereby obtaining different degrees of flexibility by using different bandwidth part units.

In one embodiment, the first indication information is carried on a resource in a common search space of a control channel or a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space; and the receiving, by the terminal device, first indication information sent by a base station includes:

receiving, by the terminal device in a first time domain position by using the control channel, the first indication information sent by the base station; and after the receiving, by the terminal device, first indication information sent by a base station, the method further includes:

receiving, by the terminal device in a second time domain position by using a data channel, data sent by the base station.

In this embodiment of this application, the frequency domain position indicated in the first indication information may not overlap with the position of the resource in the common search space or the position of the resource in the UE specific search space. In this way, the frequency domain position for sending the first indication information is different from a frequency domain position in which the terminal device actually receives data. When receiving the data sent by the base station, the terminal device needs to switch the frequency domain position. To ensure that the terminal device correctly receives the data sent by the base station, the base station sends the data to the terminal device in a time domain position after a time domain position for sending the first indication information. In this way, the terminal device receives, in the second time domain position, the data sent by the base station, thereby ensuring that the terminal receives data in a time domain position in which the base station sends the data, and effectively ensuring integrity of the received data.

In one embodiment, the first time domain position and the second time domain position belong to one scheduling unit in time domain, and the last OFDM symbol included in the first time domain position and the first OFDM symbol included in the second time domain position are separated by M OFDM symbols, where M is an integer greater than or equal to 1.

In this embodiment of this application, a time domain position difference between the first time domain position for sending the second indication information and the second time domain position for sending the data may be set to one or more OFDM symbols, for example, two symbols. In this way, after determining a quantity of symbols occupied by the position of the resource in the common search space or the position of the resource in the UE specific search space in time domain, the terminal device can accurately determine a start position of a data channel in time domain, thereby improving accuracy of data exchange between the base station and the terminal device.

In one embodiment, the bandwidth part determined by the base station is determined by the base station based on a mapping relationship between a first carrier bandwidth and a first bandwidth part set and/or a mapping relationship between a capability bandwidth of a terminal device and a second bandwidth part set, where the first bandwidth part set includes a plurality of bandwidth parts, the plurality of bandwidth parts included in the first bandwidth part set include the bandwidth part determined by the base station, the second bandwidth part set includes a plurality of bandwidth parts, and the plurality of bandwidth parts included in the second bandwidth part set include the bandwidth part determined by the base station.

In one embodiment, the method further includes: sending, by the terminal device to the base station, third indication information used to indicate the capability bandwidth of the terminal device.

In this embodiment of this application, after establishing an RRC connection to the base station, the terminal device may report the capability bandwidth of the terminal device by using RRC signaling, where the RRC signaling carries the third indication information, and the third indication information is used to indicate the capability bandwidth of the terminal device; or report the capability bandwidth of the terminal device in a random access process established with the base station, in one embodiment, add the third indication information to random access signaling in the random access process.

In one embodiment, the method further includes: determining, by the terminal device based on mapping relationships between carrier bandwidths and subcarrier spacings, a first subcarrier spacing used for resource configuration in the first carrier bandwidth, where the mapping relationships include a mapping relationship between the first carrier bandwidth and the first subcarrier spacing and a mapping relationship between a second carrier bandwidth and a second subcarrier spacing, and the first subcarrier spacing is different from the second subcarrier spacing; and determining, by the terminal device, the frequency domain position of the bandwidth part in the first carrier bandwidth based on the determined first subcarrier spacing.

In this embodiment of this application, the terminal device pre-configures the mapping relationships between carrier bandwidths and subcarrier spacings, where the mapping relationships include a plurality of different subcarrier spacings. For a plurality of base stations having different carrier bandwidths, each base station may select an appropriate subcarrier spacing based on a carrier bandwidth of the base station, to configure a resource. Assuming that the carrier bandwidth of the base station is the first carrier bandwidth, the terminal device determines, based on the pre-configured mapping relationships, a subcarrier spacing used for resource configuration in the first carrier bandwidth. This avoids a signaling overhead problem caused by using a small subcarrier spacing to configure a resource in a case of a large carrier bandwidth, thereby reducing signaling overheads required for the resource configuration.

Further, the terminal device may implicitly indicate, by binding a carrier bandwidth with a subcarrier spacing used when configuring a resource, the subcarrier spacing used when configuring the resource.

In one embodiment, the first carrier bandwidth belongs to a first carrier bandwidth range, and a subcarrier spacing used for resource configuration in each carrier bandwidth included in the first carrier bandwidth range is the first subcarrier spacing.

In this embodiment of this application, the mapping relationships between carrier bandwidths and subcarrier spacings may be a mapping relationship between one carrier bandwidth range and one subcarrier spacing, where the carrier bandwidth range includes a plurality of carrier bandwidths, thereby reducing an information amount of the mapping relationship, and reducing load of the terminal device.

In one embodiment, the first carrier bandwidth can support a plurality of subcarrier spacings, and the plurality of subcarrier spacings include the first subcarrier spacing.

In this embodiment of this application, a given carrier bandwidth supports a finite set of subcarrier spacings. In this way, the mapping relationships between carrier bandwidths and subcarrier spacings may be that one carrier bandwidth corresponds to one subcarrier spacing set. When determining a subcarrier spacing, the terminal device may determine the subcarrier spacing in a corresponding subcarrier spacing set based on an actual situation, for example, to minimum signaling overheads, select a maximum subcarrier spacing from the subcarrier spacing set; or select an appropriate subcarrier spacing based on an actual service type, thereby flexibly configuring the subcarrier spacing.

According to a seventh aspect, a base station is provided. The device includes a processing module. The module included in the device is configured to perform the resource configuration method according to the first aspect or any embodiment.

According to an eighth aspect, a base station is provided. The device includes a processing module and a sending module. The modules included in the device are configured to perform the method for determining a bandwidth part according to the second aspect or any embodiment.

According to a ninth aspect, a base station is provided. The device includes a processing module and a sending module. The modules included in the device are configured to perform the method for indicating a bandwidth part according to the third aspect or any embodiment.

According to a tenth aspect, a base station is provided. In one embodiment, a structure of the device includes a processor. The processor is configured to support the device in performing a corresponding function in the resource configuration method in the first aspect. The device may further include a memory. The memory is coupled with the processor, and is configured to store a program instruction and data that may be used with the device.

According to an eleventh aspect, a base station is provided. In one embodiment, a structure of the device includes a processor and a transmitter. The processor is configured to support the device in performing a corresponding function in the method for determining a bandwidth part in the second aspect. The transmitter is configured to send first indication information to the terminal device, where the first indication information is used to indicate the determined bandwidth part. The device may further include a memory. The memory is coupled with the processor, and is configured to store a program instruction and data that may be used with the device.

According to a twelfth aspect, a base station is provided. In one embodiment, a structure of the device includes a processor and a transmitter. The processor is configured to support the device in performing a corresponding function in the method for indicating a bandwidth part in the third aspect. The transmitter is configured to send first indication information and second indication information. The device may further include a memory. The memory is coupled with the processor, and is configured to store a program instruction and data that may be used with the device.

According to a thirteenth aspect, a terminal device is provided. The device includes a processing module. The module included in the device is configured to perform the resource configuration method according to the fourth aspect or any embodiment.

According to a fourteenth aspect, a terminal device is provided. The device includes a processing module and a receiving module. The modules included in the device are configured to perform the method for determining a bandwidth part according to the fifth aspect or any embodiment.

According to a fifteenth aspect, a terminal device is provided. The device includes a processing module and a receiving module. The modules included in the device are configured to perform the method for indicating a bandwidth part according to the sixth aspect or any embodiment.

According to a sixteenth aspect, a terminal device is provided. In one embodiment, a structure of the device includes a processor. The processor is configured to support the device in performing a corresponding function in the resource configuration method in the fourth aspect. The device may further include a memory. The memory is coupled with the processor, and is configured to store a program instruction and data that may be used with the device.

According to a seventeenth aspect, a terminal device is provided. In one embodiment, a structure of the device includes a processor and a receiver. The processor is configured to support the device in performing a corresponding function in the method for determining a bandwidth part in the fifth aspect. The receiver is configured to receive first indication information. The device may further include a memory. The memory is coupled with the processor, and is configured to store a program instruction and data that may be used with the device.

According to an eighteenth aspect, a terminal device is provided. In one embodiment, a structure of the device includes a processor and a receiver. The processor is configured to support the device in performing a corresponding function in the method for indicating a bandwidth part in the sixth aspect. The receiver is configured to receive first indication information and second indication information. The device may further include a memory. The memory is coupled with the processor, and is configured to store a program instruction and data that may be used with the device.

According to a nineteenth aspect, an apparatus is provided. The apparatus may be a base station or an apparatus in a base station. The apparatus may include a determining module and a communications module, configured to implement corresponding functions performed by the base station in any example of the first aspect, where:

the determining module is configured to determine, based on mapping relationships between carrier bandwidths and subcarrier spacings, a first subcarrier spacing used for resource configuration in a first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing; and the communications module is configured to configure a resource for a terminal device based on the determined first subcarrier spacing.

In one embodiment, for a relationship between the first carrier bandwidth and the first subcarrier spacing, refer to descriptions of the first carrier bandwidth and the first subcarrier spacing in the first aspect, and details are not limited herein again.

According to a twentieth aspect, an apparatus is provided. The apparatus may be a base station or an apparatus in a base station. The apparatus may include a determining module and a communications module, configured to implement corresponding functions performed by the base station in any example of the second aspect, where:

the determining module is configured to determine a bandwidth part based on a mapping relationship between a first carrier bandwidth and a first bandwidth part set and/or a mapping relationship between a capability bandwidth of a terminal device and a second bandwidth part set, where the first bandwidth part set includes a plurality of bandwidth parts, the first bandwidth part set includes the determined bandwidth part, the second bandwidth part set includes a plurality of bandwidth parts, and the second bandwidth part set includes the determined bandwidth part; and the communications module is configured to send first indication information, where the first indication information is used to indicate the determined bandwidth part.

In one embodiment, the communications module is further configured to receive second indication information, where the second indication information is used to indicate the capability bandwidth of the terminal device.

In one embodiment, for a process of determining, by the determining module, the bandwidth part based on the mapping relationship between the first carrier bandwidth and the first bandwidth part set and/or the mapping relationship between the capability bandwidth of the terminal device and the second bandwidth part set, refer to the second aspect, and details are not limited herein again.

In one embodiment, the sending, by the communications module, first indication information may include: sending third indication information and fourth indication information, where the third indication information is used to indicate a frequency domain position of the determined bandwidth part in the first carrier bandwidth to the terminal device, the determined bandwidth part includes one or more bandwidth part units, and the fourth indication information is used to indicate a frequency domain position of a scheduled physical resource block in the bandwidth part.

In one embodiment, the bandwidth part unit is a RBG, a SS bandwidth, or a PRB.

In one embodiment, for a process of sending, by the communications module, the third indication information and the fourth indication information to the terminal device, refer to the second aspect, and details are not limited herein again.

In one embodiment, the determining module is further configured to: determine, based on mapping relationships between carrier bandwidths and subcarrier spacings, a first subcarrier spacing used for resource configuration in the first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing; and determine the frequency domain position of the determined bandwidth part in the first carrier bandwidth based on the determined first subcarrier spacing.

In one embodiment, for a relationship between the carrier bandwidth and the subcarrier spacing, refer to descriptions of the carrier bandwidth and the subcarrier spacing in the second aspect, and details are not limited herein again.

According to a twenty-first aspect, an apparatus is provided. The apparatus may be a base station or an apparatus in a base station. The apparatus may include a determining module and a communications module. The modules can implement corresponding functions performed by the base station in any example of the third aspect, where:

the determining module is configured to determine a bandwidth part configured for a terminal device; and the communications module is configured to: send first indication information, where the first indication information is used to indicate a frequency domain position of the bandwidth part in the first carrier bandwidth to the terminal device, and the determined bandwidth part includes one or more bandwidth part units; and send second indication information, where the second indication information is used to indicate a frequency domain position of a scheduled physical resource block in the bandwidth part.

In one embodiment, the bandwidth part unit is a RBG, a SS bandwidth, or a PRB.

In one embodiment, for a process of sending, by the communications module, the first indication information to the terminal device, refer to the third aspect, and details are not limited herein again.

In one embodiment, the determining module is further configured to determine the bandwidth part based on a mapping relationship between the first carrier bandwidth and a first bandwidth part set and/or a mapping relationship between a capability bandwidth of the terminal device and a second bandwidth part set, where the first bandwidth part set includes a plurality of bandwidth parts, the first bandwidth part set includes the determined bandwidth part, the second bandwidth part set includes a plurality of bandwidth parts, and the second bandwidth part set includes the determined bandwidth part; and the communications module is further configured to send the first indication information, where the first indication information is used to indicate the determined bandwidth part.

In one embodiment, the communications module is further configured to receive the second indication information, where the second indication information is used to indicate the capability bandwidth of the terminal device.

In one embodiment, for a process of determining, by the determining module, the bandwidth part based on the mapping relationship between the first carrier bandwidth and the first bandwidth part set and/or the mapping relationship between the capability bandwidth of the terminal device and the second bandwidth part set, refer to the third aspect, and details are not limited herein again.

In one embodiment, the determining module is further configured to: determine, based on mapping relationships between carrier bandwidths and subcarrier spacings, a first subcarrier spacing used for resource configuration in the first carrier bandwidth, where the mapping relationships include a mapping relationship between the first carrier bandwidth and the first subcarrier spacing and a mapping relationship between a second carrier bandwidth and a second subcarrier spacing, and the first subcarrier spacing is different from the second subcarrier spacing; and determine, based on the determined first subcarrier spacing, the frequency domain position of the bandwidth part in the first carrier bandwidth.

In one embodiment, for a relationship between the carrier bandwidth and the subcarrier spacing, refer to descriptions of the carrier bandwidth and the subcarrier spacing in the third aspect, and details are not limited herein again.

According to a twenty-second aspect, an apparatus is provided. The apparatus may be a terminal device or an apparatus in a terminal device. The apparatus may include a determining module, configured to implement a corresponding function performed by the terminal device in any example of the fourth aspect, where:

the determining module is configured to: determine, based on mapping relationships between carrier bandwidths and subcarrier spacings, a first subcarrier spacing used for resource configuration in a first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, the first subcarrier spacing is different from the second subcarrier spacing, and the first carrier bandwidth is a carrier bandwidth indicated by a base station to the terminal device; and determine, based on the determined first subcarrier spacing, a position of a resource allocated by the base station to the terminal device.

In one embodiment, for a relationship between the carrier bandwidth and the subcarrier spacing, refer to descriptions of the carrier bandwidth and the subcarrier spacing in the fourth aspect, and details are not limited herein again.

According to a twenty-third aspect, an apparatus is provided. The apparatus may be a terminal device or an apparatus in a terminal device. The apparatus may include a determining module and a communications module, configured to implement corresponding functions performed by the terminal device in any example of the fifth aspect, where:

the communications module is configured to receive first indication information, where the first indication information is used to indicate a bandwidth part configured for the terminal device; and the determining module is configured to determine, according to the first indication information, the bandwidth part configured for the terminal device.

In one embodiment, the communications module is further configured to send second indication information used to indicate a capability bandwidth of the terminal device.

In one embodiment, the receiving, by the communications module, first indication information may include: receiving third indication information and fourth indication information, where the third indication information is used to indicate a frequency domain position, in the first carrier bandwidth, of the bandwidth part configured for the terminal device, the bandwidth part configured for the terminal device includes one or more bandwidth part units, and the fourth indication information is used to indicate a frequency domain position of a scheduled physical resource block in the bandwidth part configured for the terminal device.

In one embodiment, the bandwidth part unit is a RBG, a SS bandwidth, or a PRB.

In one embodiment, for a process of receiving, by the communications module, the third indication information and the fourth indication information that are sent by the base station, refer to the fifth aspect, and details are not limited herein again.

In one embodiment, the determining module is further configured to: determine, based on mapping relationships between carrier bandwidths and subcarrier spacings, a first subcarrier spacing used for resource configuration in the first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing; and determine, based on the determined first subcarrier spacing, the frequency domain position, in the first carrier bandwidth, of the bandwidth part configured for the terminal device.

In one embodiment, for a relationship between the carrier bandwidth and the subcarrier spacing, refer to descriptions of the carrier bandwidth and the subcarrier spacing in the fifth aspect, and details are not limited herein again.

According to a twenty-fourth aspect, an apparatus is provided. The apparatus may be a terminal device or an apparatus in a terminal device. The apparatus may include a determining module and a communications module. The modules can implement corresponding functions performed by the terminal device in any example of the sixth aspect, where:

the communications module is configured to receive first indication information and second indication information, where the first indication information is used to indicate, to the terminal device, a frequency domain position, in a first carrier bandwidth, of a bandwidth part configured for the terminal device, the first carrier bandwidth is a carrier bandwidth indicated to the terminal device, the bandwidth part configured for the terminal device includes a plurality of bandwidth part units, and the second indication information is used to indicate a frequency domain position of a scheduled physical resource block in the bandwidth part configured for the terminal device; and the determining module is configured to determine, according to the first indication information and the second indication information, the bandwidth part configured for the terminal device.

In one embodiment, the bandwidth part unit configured for the terminal device is a RBG, a SS bandwidth, or a PRB.

In one embodiment, for a process of receiving, by the communications module, the first indication information and the second indication information, refer to the sixth aspect, and details are not limited herein again.

In one embodiment, the communications module is further configured to send third indication information, where the third indication information is used to indicate a capability bandwidth of the terminal device.

In one embodiment, the determining module is further configured to: determine, based on mapping relationships between carrier bandwidths and subcarrier spacings, a first subcarrier spacing used for resource configuration in the first carrier bandwidth, where the mapping relationships include a mapping relationship between the first carrier bandwidth and the first subcarrier spacing and a mapping relationship between a second carrier bandwidth and a second subcarrier spacing, and the first subcarrier spacing is different from the second subcarrier spacing; and determine, based on the determined first subcarrier spacing, the frequency domain position of the bandwidth part in the first carrier bandwidth.

In one embodiment, for a relationship between the carrier bandwidth and the subcarrier spacing, refer to descriptions of the carrier bandwidth and the subcarrier spacing in the sixth aspect, and details are not limited herein again.

According to a twenty-fifth aspect, an apparatus is provided. The apparatus includes a processor, configured to implement the method described in the first aspect. The apparatus may further include a memory, configured to store a program instruction and data. The memory is coupled with the processor. The processor may invoke and execute the program instruction stored in the memory, to implement the method described in the first aspect. The apparatus may further include a communications interface. The communications interface is used by the apparatus to communicate with another device.

In one embodiment, the apparatus includes:

a memory, configured to store a program instruction; and a processor, configured to: determine, based on mapping relationships between carrier bandwidths and subcarrier spacings, a first subcarrier spacing used for resource configuration in a first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing; and configure a resource for a terminal device based on the determined first subcarrier spacing.

In one embodiment, for a relationship between the first carrier bandwidth and the first subcarrier spacing, refer to descriptions of the first carrier bandwidth and the first subcarrier spacing in the first aspect, and details are not limited herein again.

According to a twenty-sixth aspect, an apparatus is provided. The apparatus includes a processor, configured to implement the method described in the second aspect. The apparatus may further include a memory, configured to store a program instruction and data. The memory is coupled with the processor. The processor may invoke and execute the program instruction stored in the memory, to implement the method described in the second aspect. The apparatus may further include a communications interface. The communications interface is used by the apparatus to communicate with another device.

In one embodiment, the apparatus includes:
a communications interface;
a memory, configured to store a program instruction; and
a processor, configured to determine a bandwidth part based on a mapping relationship between a first carrier bandwidth and a first bandwidth part set and/or a mapping relationship between a capability bandwidth of a terminal device and a second bandwidth part set, where the first bandwidth part set includes a plurality of bandwidth parts, the first bandwidth part set includes the determined bandwidth part, the second bandwidth part set includes a plurality of bandwidth parts, and the second bandwidth part set includes the determined bandwidth part; and the processor is further configured to send first indication information by using the communications interface, where the first indication information is used to indicate the determined bandwidth part.

In one embodiment, the processor is further configured to receive second indication information by using the communications interface, where the second indication information is used to indicate the capability bandwidth of the terminal device.

In one embodiment, for a process of determining, by the processor, the bandwidth part based on the mapping relationship between the first carrier bandwidth and the first bandwidth part set and/or the mapping relationship between the capability bandwidth of the terminal device and the second bandwidth part set, refer to the second aspect, and details are not limited herein again.

In one embodiment, the sending, by the processor, first indication information by using the communications module may include: sending third indication information and fourth indication information, where the third indication information is used to indicate a frequency domain position of the determined bandwidth part in the first carrier bandwidth to the terminal device, the determined bandwidth part includes one or more bandwidth part units, and the fourth indication information is used to indicate a frequency domain position of a scheduled physical resource block in the bandwidth part.

In one embodiment, the bandwidth part unit is a RBG, a SS bandwidth, or a PRB.

In one embodiment, for a process of sending the third indication information and the fourth indication information, refer to the second aspect, and details are not limited herein again.

In one embodiment, the processor is further configured to: determine, based on mapping relationships between carrier bandwidths and subcarrier spacings, a first subcarrier spacing used for resource configuration in the first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing; and determine the frequency domain position of the determined bandwidth part in the first carrier bandwidth based on the determined first subcarrier spacing.

In one embodiment, for a relationship between the carrier bandwidth and the subcarrier spacing, refer to descriptions of the carrier bandwidth and the subcarrier spacing in the second aspect, and details are not limited herein again.

According to a twenty-seventh aspect, an apparatus is provided. The apparatus includes a processor, configured to implement the method described in the third aspect. The apparatus may further include a memory, configured to store a program instruction and data. The memory is coupled with the processor. The processor may invoke and execute the program instruction stored in the memory, to implement the method described in the third aspect. The apparatus may further include a communications interface. The communications interface is used by the apparatus to communicate with another device.

In one embodiment, the apparatus includes:
a communications interface;
a memory, configured to store a program instruction; and
a processor, configured to determine a bandwidth part of a terminal device, where the processor is further configured to: send first indication information by using the communications interface, where the first indication information is used to indicate a frequency domain position of the bandwidth part in the first carrier bandwidth to the terminal device, and the determined bandwidth part includes one or more bandwidth part units; and send second indication information, where the second indication information is used to indicate a frequency domain position of a scheduled physical resource block in the bandwidth part.

In one embodiment, the bandwidth part unit is a RBG, a SS bandwidth, or a PRB.

In one embodiment, for a process of sending, by the communications module, the first indication information and the second indication information to the terminal device, refer to the third aspect, and details are not limited herein again.

In one embodiment, the processor is further configured to determine the bandwidth part based on a mapping relationship between the first carrier bandwidth and a first bandwidth part set and/or a mapping relationship between a capability bandwidth of the terminal device and a second bandwidth part set, where the first bandwidth part set includes a plurality of bandwidth parts, the first bandwidth part set includes the determined bandwidth part, the second bandwidth part set includes a plurality of bandwidth parts, and the second bandwidth part set includes the determined bandwidth part; and the processor is further configured to send the first indication information by using the communications interface, where the first indication information is used to indicate the determined bandwidth part.

In one embodiment, the processor is further configured to receive the second indication information by using the communications interface, where the second indication information is used to indicate the capability bandwidth of the terminal device.

In one embodiment, for a process of determining, by the processor, the bandwidth part based on the mapping relationship between the first carrier bandwidth and the first bandwidth part set and/or the mapping relationship between the capability bandwidth of the terminal device and the second bandwidth part set, refer to the third aspect, and details are not limited herein again.

In one embodiment, the processor is further configured to: determine, based on mapping relationships between carrier bandwidths and subcarrier spacings, a first subcarrier spacing used for resource configuration in the first carrier bandwidth, where the mapping relationships include a mapping relationship between the first carrier bandwidth and the first subcarrier spacing and a mapping relationship between a second carrier bandwidth and a second subcarrier spacing, and the first subcarrier spacing is different from the second subcarrier spacing; and determine, based on the determined first subcarrier spacing, the frequency domain position of the bandwidth part in the first carrier bandwidth.

In one embodiment, for a relationship between the carrier bandwidth and the subcarrier spacing, refer to descriptions of the carrier bandwidth and the subcarrier spacing in the third aspect, and details are not limited herein again.

According to a twenty-eighth aspect, an apparatus is provided. The apparatus includes a processor, configured to implement the method described in the fourth aspect. The apparatus may further include a memory, configured to store a program instruction and data. The memory is coupled with the processor. The processor may invoke and execute the program instruction stored in the memory, to implement the method described in the fourth aspect. The apparatus may further include a communications interface. The communications interface is used by the apparatus to communicate with another device.

In one embodiment, the apparatus includes:
a communications interface;
a memory, configured to store a program instruction; and
a processor, configured to: determine, based on mapping relationships between carrier bandwidths and subcarrier spacings, a first subcarrier spacing used for resource configuration in a first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, the first subcarrier spacing is different from the second subcarrier spacing, and the first carrier bandwidth is a carrier bandwidth indicated by a base station to the terminal device; and determine, based on the determined first subcarrier spacing, a position of a resource allocated by the base station to the terminal device.

In one embodiment, for a relationship between the carrier bandwidth and the subcarrier spacing, refer to descriptions of the carrier bandwidth and the subcarrier spacing in the fourth aspect, and details are not limited herein again.

According to a twenty-ninth aspect, an apparatus is provided. The apparatus includes a processor, configured to implement the method described in the fifth aspect. The apparatus may further include a memory, configured to store a program instruction and data. The memory is coupled with the processor. The processor may invoke and execute the program instruction stored in the memory, to implement the method described in the fifth aspect. The apparatus may further include a communications interface. The communications interface is used by the apparatus to communicate with another device.

In one embodiment, the apparatus includes:
a communications interface;
a memory, configured to store a program instruction; and
a processor, configured to receive first indication information by using the communications interface, where the first indication information is used to indicate a bandwidth part configured for a terminal device, where the processor is further configured to determine, according to the first indication information, the bandwidth part configured for the terminal device.

In one embodiment, the processor is further configured to send, by using the communications module, second indication information used to indicate a capability bandwidth of the terminal device.

In one embodiment, the receiving first indication information may include: receiving third indication information and fourth indication information, where the third indication information is used to indicate a frequency domain position, in the first carrier bandwidth, of the bandwidth part configured for the terminal device, the bandwidth part configured for the terminal device includes one or more bandwidth part units, and the fourth indication information is used to indicate a frequency domain position of a scheduled physical resource block in the bandwidth part configured for the terminal device.

In one embodiment, the bandwidth part unit configured for the terminal device is a RBG, a SS bandwidth, or a PRB.

In one embodiment, for a process of receiving the third indication information and the fourth indication information, refer to the fifth aspect, and details are not limited herein again.

In one embodiment, the processor is further configured to: determine, based on mapping relationships between carrier bandwidths and subcarrier spacings, a first subcarrier spacing used for resource configuration in the first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing; and determine, based on the determined first subcarrier spacing, the frequency domain position, in the first carrier bandwidth, of the bandwidth part configured for the terminal device.

In one embodiment, for a relationship between the carrier bandwidth and the subcarrier spacing, refer to descriptions of the carrier bandwidth and the subcarrier spacing in the fifth aspect, and details are not limited herein again.

According to a thirtieth aspect, an apparatus is provided. The apparatus includes a processor, configured to implement the method described in the sixth aspect. The apparatus may further include a memory, configured to store a program instruction and data. The memory is coupled with the processor. The processor may invoke and execute the program instruction stored in the memory, to implement the method described in the sixth aspect. The apparatus may further include a communications interface. The communications interface is used by the apparatus to communicate with another device.

In one embodiment, the apparatus includes:
a communications interface;
a memory, configured to store a program instruction; and
a processor, configured to receive first indication information and second indication information by using the communications module, where the first indication information is used to indicate, to the terminal device, a frequency domain position, in a first carrier bandwidth, of a bandwidth part configured for the terminal device, the first carrier bandwidth is a carrier bandwidth indicated to the terminal device, the bandwidth part configured for the terminal device includes a plurality of bandwidth part units, and the second indication information is used to indicate a frequency domain position of a scheduled physical resource block in the bandwidth part configured for the terminal device, where the processor is configured to determine, according to the first indication information and the second indication information, the bandwidth part configured for the terminal device.

In one embodiment, the bandwidth part unit configured for the terminal device is a RBG, a SS bandwidth, or a PRB.

In one embodiment, for a process of receiving the first indication information and the second indication information, refer to the sixth aspect, and details are not limited herein again.

In one embodiment, the processor is further configured to send third indication information by using the communications module, where the third indication information is used to indicate a capability bandwidth of the terminal device.

In one embodiment, the processor is further configured to: determine, based on mapping relationships between carrier bandwidths and subcarrier spacings, a first subcarrier spacing used for resource configuration in the first carrier bandwidth, where the mapping relationships include a mapping relationship between the first carrier bandwidth and the first subcarrier spacing and a mapping relationship between a second carrier bandwidth and a second subcarrier spacing, and the first subcarrier spacing is different from the second subcarrier spacing; and determine, based on the determined first subcarrier spacing, the frequency domain position of the bandwidth part in the first carrier bandwidth.

In one embodiment, for a relationship between the carrier bandwidth and the subcarrier spacing, refer to descriptions of the carrier bandwidth and the subcarrier spacing in the sixth aspect, and details are not limited herein again.

According to a thirty-first aspect, a computer-readable storage medium is provided. The computer-readable storage medium includes a program used to perform the method according to any one of the first aspect to the sixth aspect or any possible embodiment thereof.

According to a thirty-second aspect, this application provides a computer program product including an instruction. When the instruction is run on a computer, the computer is enabled to perform the method according to any one of the first aspect to the sixth aspect or any possible embodiment thereof.

According to a thirty-third aspect, this application provides a communications system. The communications system includes the base station according to any one of the seventh aspect to the twelfth aspect and the terminal device according to any one of the thirteenth aspect to eighteenth aspect.

According to a thirty-fourth aspect, this application provides a communications system. The communications system includes the base station according to the seventh aspect and the terminal device according to the thirteenth aspect.

According to a thirty-fifth aspect, this application provides a communications system. The communications system includes the base station according to the eighth aspect and the terminal device according to the fourteenth aspect.

According to a thirty-sixth aspect, this application provides a communications system. The communications system includes the base station according to the ninth aspect and the terminal device according to the fifteenth aspect.

According to a thirty-seventh aspect, this application provides a communications system. The communications system includes the base station according to the tenth aspect and the terminal device according to the sixteenth aspect.

According to a thirty-eighth aspect, this application provides a communications system. The communications system includes the base station according to the eleventh aspect and the terminal device according to the seventeenth aspect.

According to a thirty-ninth aspect, this application provides a communications system. The communications system includes the base station according to the twelfth aspect and the terminal device according to the eighteenth aspect.

According to a fortieth aspect, this application provides a communications system. The communications system includes the apparatus according to the nineteenth aspect and the apparatus according to the twenty-second aspect.

According to a forty-first aspect, this application provides a communications system. The communications system includes the apparatus according to the twentieth aspect and the apparatus according to the twenty-third aspect.

According to a forty-second aspect, this application provides a communications system. The communications system includes the apparatus according to the twenty-first aspect and the apparatus according to the twenty-fourth aspect.

According to a forty-third aspect, this application provides a communications system. The communications system includes the apparatus according to the twenty-fifth aspect and the apparatus according to the twenty-eighth aspect.

According to a forty-fourth aspect, this application provides a communications system. The communications system includes the apparatus according to the twenty-sixth aspect and the apparatus according to the twenty-ninth aspect.

According to a forty-fifth aspect, this application provides a communications system. The communications system includes the apparatus according to the twenty-seventh aspect and the apparatus according to the thirtieth aspect.

According to a forty-sixth aspect, this application provides a chip system. The chip system includes a processor, and may further include a memory, to implement any one of the first aspect to the third aspect and one or more possible embodiments thereof.

According to a forty-seventh aspect, this application provides a chip system. The chip system includes a processor, and may further include a memory, to implement any one of the fourth aspect to the sixth aspect and one or more possible embodiments thereof.

DESCRIPTION OF EMBODIMENTS

Figure 1:
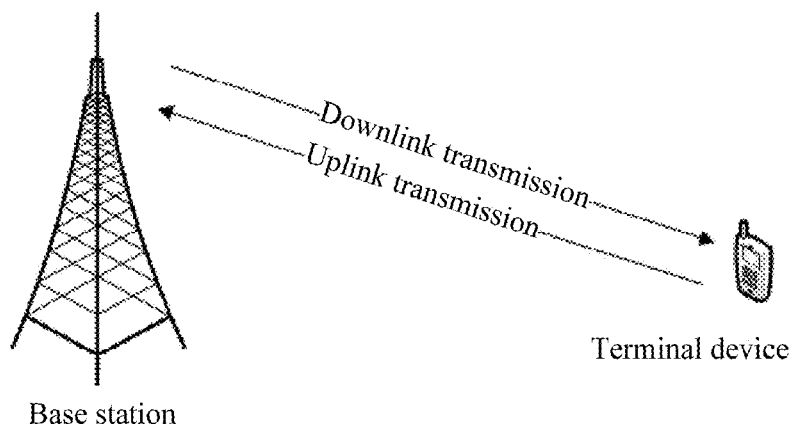
FIG. 1 is a schematic diagram of a possible network architecture according to an embodiment of this application.

Technical solutions in embodiments of this application may be applied to various communications systems, for example, a new radio (NR) system, wireless fidelity (wifi), worldwide interoperability for microwave access (WiMAX), a global system for mobile communications (GSM) system, a code division multiple access (CDMA) system, a wideband code division multiple access (WCDMA) system, a general packet radio service (GPRS), a long term evolution (LTE) system, a long term evolution advanced (LTE-A) system, a universal mobile telecommunications system (UMTS), a 3rd generation partnership project (3GPP) related cellular system, and a fifth-generation (5G) mobile communications system.

In the following, some terms in this application are described, so as to help persons skilled in the art have a better understanding.

(1) A "base station" described in this application, which may also be referred to as an access network device, may be a gNB (gNode B), an ordinary base station (NodeB, NB) in the WCDMA system, an evolved NodeB (eNB or eNodeB) in the LTE system, or a base transceiver station (BTS) in GSM or CDMA, a new radio controller (NR controller), a centralized network element (Centralized Unit), a new radio base station, a remote radio unit, a micro base station, a distributed network element (Distributed Unit), a reception point (Transmission Reception Point, TRP) or a transmission point (TP), or a radio controller in a cloud radio access network (CRAN) scenario. Alternatively, the network device may be a relay station, an access point, an in-vehicle device, a wearable device, a network device in a future 5G network, a network device in a future evolved PLMN network, or any other wireless access device. However, this is not limited in the embodiments of this application.

(2) A terminal device may be a wireless terminal device or a wired terminal device. The wireless terminal device may refer to a device that provides a user with voice and/or data connectivity, a handheld device with a wireless connection function, or another processing device connected to a wireless modem. The wireless terminal device may communicate with one or more core networks through a radio access network (RAN). The wireless terminal device may be a mobile terminal device, such as a mobile phone (also referred to as a "cellular" phone) and a computer with a mobile terminal device, for example, may be a portable, pocket-sized, handheld, computer built-in, or in-vehicle mobile apparatus, which exchanges voice and/or data with the radio access network. For example, the wireless terminal device may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit (SU), a subscriber station (SS), a mobile station (MB), a mobile console (Mobile), a remote station (RS), an access point (AP), a remote terminal (RT), an access terminal (AT), a user terminal (UT), a user agent (UA), or a terminal device (User Device, UD), or user equipment (UE).

(3) A time-domain scheduling unit is a unit including one slot, one subframe, or one mini-slot, or a unit aggregated by a plurality of slots, a plurality of subframes, or a plurality of mini-slots.

(4) A time domain position is a position of an OFDM symbol in a time-domain scheduling unit.

(5) Subcarrier spacing: A subcarrier is a basic unit in frequency domain, and a subcarrier spacing is a frequency domain spacing between neighboring subcarrier peaks. For example, in LTE, a subcarrier spacing is 15 kHz.

(6) A bandwidth part is a part of a channel bandwidth, may also be referred to as an "operating bandwidth" or a transmission bandwidth, and is a bandwidth determined in the first operation of two-level resource allocation in data transmission.

(7) A capability bandwidth of a terminal device is a maximum bandwidth capability supported by the terminal device.

(8) A carrier bandwidth may also be referred to as a "channel bandwidth" or a "system bandwidth", and is a cell-level bandwidth determined on a base station side.

(9) A control channel is a channel used to carry downlink control information (DCI), for example, a physical downlink control channel (PDCCH) in LTE.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Unless mentioned to the contrary, ordinal numbers "first", "second", "third" and "fourth" mentioned in the embodiments of this application are used to distinguish a plurality of objects, and are not intended to limit an order, a time sequence, priorities, and importance of the plurality of objects.

The following briefly describes application scenarios in the embodiments of this application.

In a wireless communications system, whether a terminal device needs to send uplink data to a base station or a base station needs to send downlink data to a terminal device, the base station first needs to allocate a bandwidth part to the terminal device from a carrier bandwidth supported by the system. In LTE, after an eNodeB configures a system bandwidth by using a MIB, the base station directly indicates, to a terminal device, a physical resource block that is in the system bandwidth and that is used to transmit data, so that the base station and the terminal device transmit data on a full bandwidth of the system bandwidth.

FIG. 1 is a schematic diagram of a possible network architecture according to an embodiment of this application. A communications system in FIG. 1 may include a terminal device and a base station. The base station is configured to provide a communications service for the terminal device and enable the terminal device to access a core network. The terminal accesses the network by searching for a synchronization signal, a broadcast signal, or the like sent by the base station.

It should be noted that in a scenario shown in FIG. 1, interaction between only one base station and one terminal device is used as an example for description, and no limitation should be imposed on the application scenario in this application. In an actual network architecture, a plurality of base stations and a plurality of terminals may be included. For example, one terminal device may perform data transmission with only one base station or a plurality of base stations. One base station may perform data transmission with only one terminal device or a plurality of terminal devices. This is not limited in this application.

Figure 2:
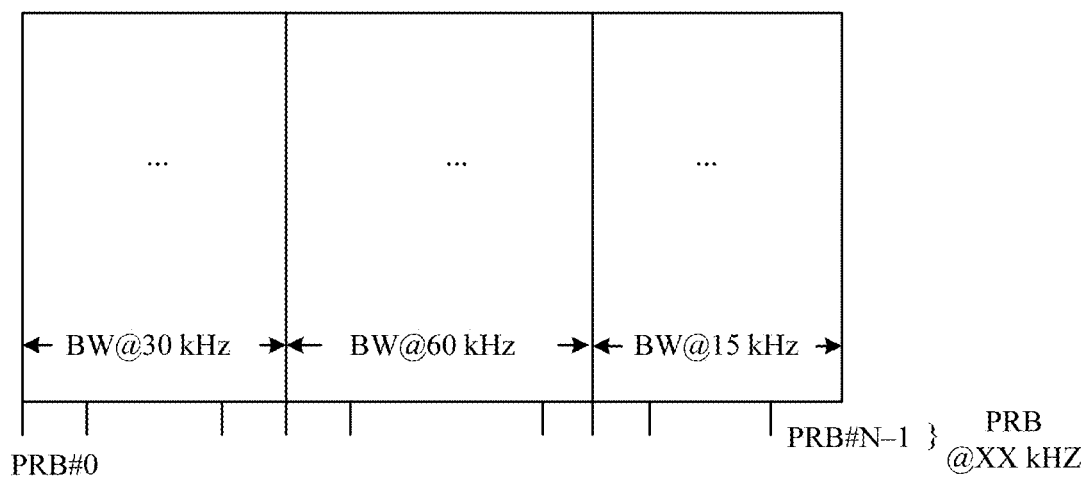
FIG. 2 is a schematic diagram of a plurality of subcarrier spacings introduced in a next-generation communications system.
Figure 3:
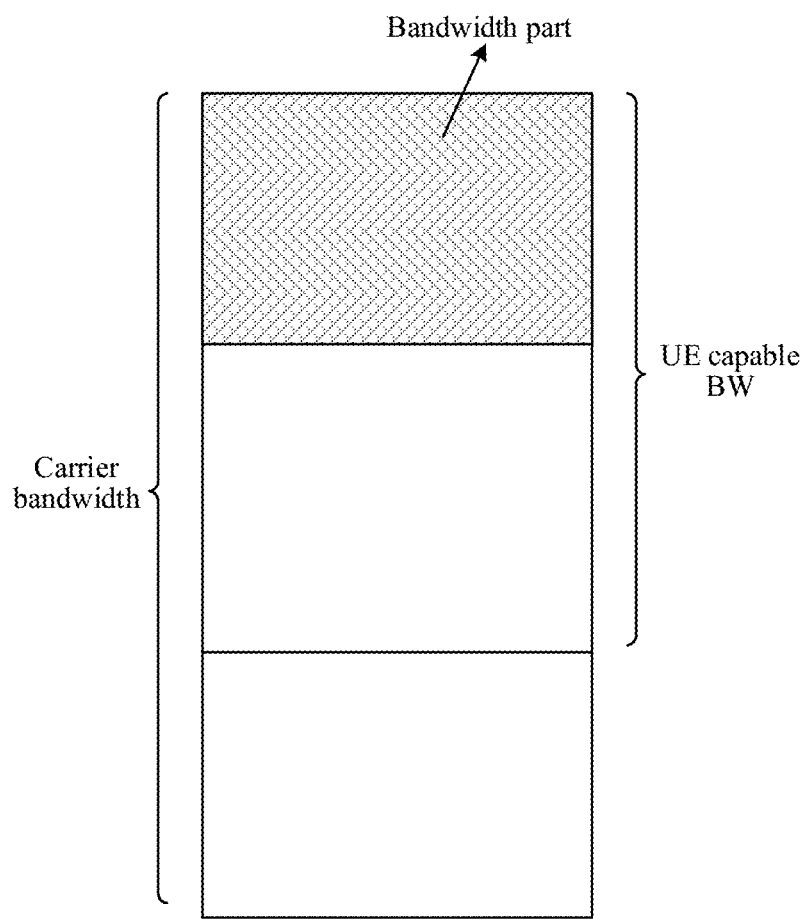
FIG. 3 is a schematic diagram of a two-level user resource allocation indication method proposed in a next-generation communications system.

A next-generation communications system will support a larger carrier bandwidth. For example, in an NR system, a maximum carrier bandwidth may be 400 MHz. However, some UEs do not support such a large carrier bandwidth capability, or a service of a UE does not require such a large carrier bandwidth. In addition, because a plurality of sub-carrier spacings are introduced in the next-generation communications system, a carrier bandwidth may be divided into a plurality of sub-bands, where different sub-bands may use different subcarrier spacings, as shown in FIG. 2. Therefore, in the next-generation communications system, a two-level user equipment resource allocation indication method is proposed. First, a bandwidth that is less than or equal to a maximum bandwidth supported by a user equipment and that is in the carrier bandwidth is indicated as a bandwidth part of the user equipment, as shown in FIG. 3. Second, a resource block or a resource block set that is in the bandwidth part and that is scheduled for the user equipment is indicated. For example, a bandwidth part includes 0 to 199 PRBs. The base station further indicates, to the terminal device, that 0 to 99 PRBs in the 0 to 199 PRBs are used to transmit data in the bandwidth part.

In view of this, embodiments of this application provide a method for determining a bandwidth part, to determine a bandwidth part of a terminal device in a carrier bandwidth and indicate the bandwidth part to the terminal device. In the method, a base station pre-configures mapping relationships between carrier bandwidths and bandwidth part sets and/or mapping relationships between capability bandwidths of terminal devices and bandwidth part sets. The mapping relationships may include the mapping relationships between carrier bandwidths and bandwidth part sets, the mapping relationships between capability bandwidths of terminal devices and bandwidth part sets, or a combination thereof. The mapping relationships between carrier bandwidths and bandwidth part sets include a plurality of carrier bandwidths, and each carrier bandwidth corresponds to one bandwidth part set. The mapping relationships between capability bandwidths of terminal devices and bandwidth part sets include capability bandwidths of a plurality of terminal devices, and a capability bandwidth of each terminal device corresponds to one bandwidth part set. The bandwidth part set includes a plurality of bandwidth parts. In this way, a plurality of bandwidth parts are pre-configured for different carrier bandwidths and capability bandwidths of different terminal devices. When determining a bandwidth part, the base station determines the bandwidth part based on the pre-configured mapping relationships bandwidth part. This resolves a problem of adaptively selecting a bandwidth part based on a different carrier bandwidth or a different UE capability, and improves flexibility of determining a bandwidth part of a terminal device.

Further, when determining a bandwidth part, the base station can determine the bandwidth part in a plurality of bandwidth parts, facilitating adaptive adjustment of a bandwidth part by the base station based on an actual requirement, for example, adjustment of a bandwidth part based on a different service type.

In the embodiments of this application, an apparatus implementing a function of the base station may be a base station, or an apparatus supporting the base station to implement the function, for example, a chip system. In the embodiments of this application, that the apparatus implementing the function of the base station is a base station is used as an example to describe the technical solution provided in the embodiments of this application.

In the embodiments of this application, an apparatus implementing a function of the terminal device may be a terminal device, or an apparatus supporting the terminal device to implement the function, for example, a chip system. In the embodiments of this application, that the apparatus implementing the function of the terminal device is a terminal device is used as an example, and that the terminal device is a UE is as an example, to describe the technical solution provided in the embodiments of this application.

The following describes the technical solution provided in the embodiments of this application in detail with reference to the accompanying drawings in this specification and possible implementations. In the following descriptions, that the technical solution provided in the embodiments of this application is applied to the application scenario shown in FIG. 1 and that the terminal device is a UE are used as an example.

Figure 4:
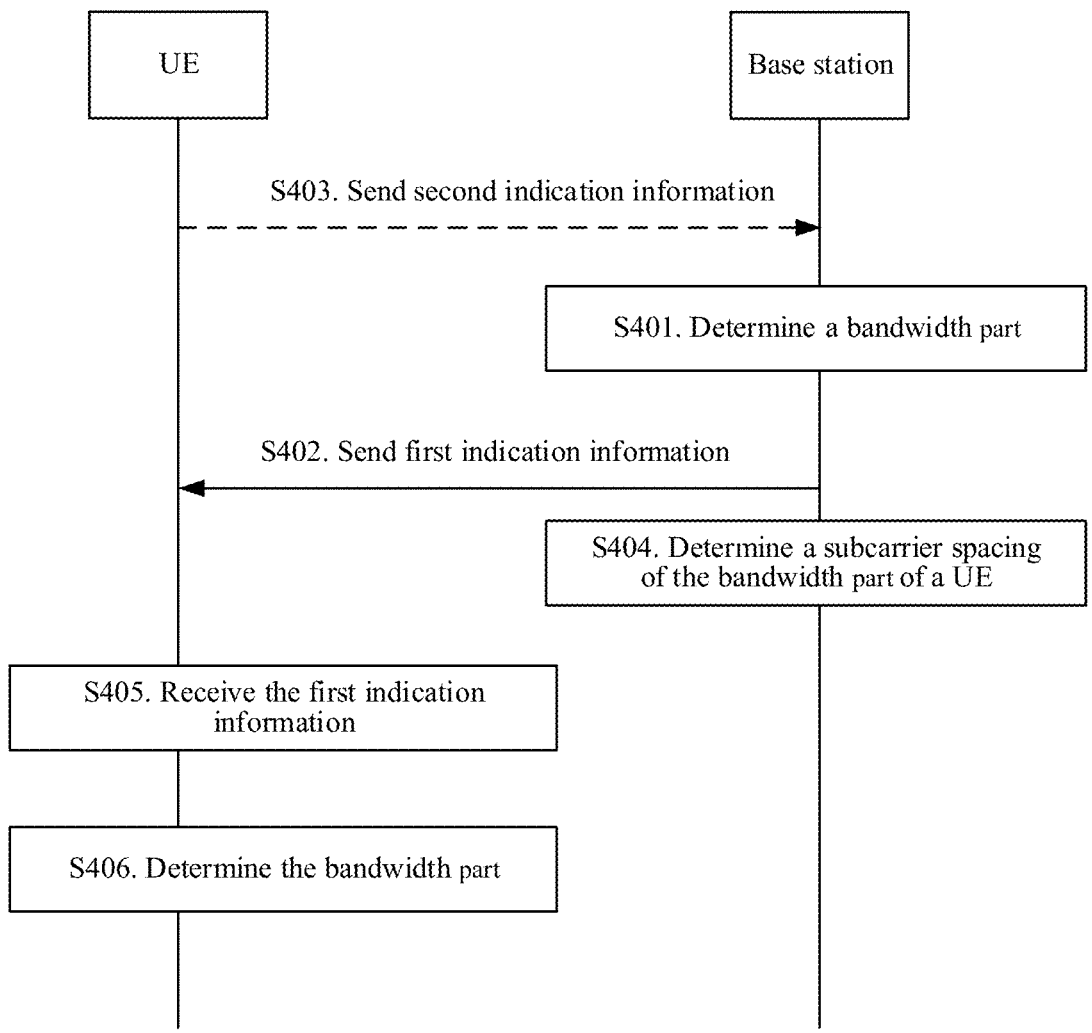
FIG. 4 is a flowchart of a method for determining a bandwidth part according to an embodiment of this application.

Referring to FIG. 4, an embodiment of this application provides a method for determining a bandwidth part. A procedure of the method is described as follows.

In this embodiment of this application, before allocating a bandwidth part to a UE, a base station in a communications system configures a carrier bandwidth for a cell in which the UE is located, for example, configuring a carrier bandwidth based on a service type of the cell or a quantity of UEs supported by the cell. Alternatively, the base station may configure a carrier bandwidth according to a preset configuration rule. This is not limited in this application. In the following descriptions, that a carrier configured by the base station for the cell is a first carrier bandwidth is used as an example for description.

The method for determining a bandwidth part 400 includes the following operations.

S401. The base station determines the bandwidth part.

In one embodiment, the base station determines the bandwidth part based on a mapping relationship between a first carrier bandwidth and a first bandwidth part set and/or a mapping relationship between a capability bandwidth of a terminal device and a second bandwidth part set.

The first bandwidth part set includes a plurality of bandwidth parts, the first bandwidth part set includes the determined bandwidth part, the second bandwidth part set includes a plurality of bandwidth parts, and the second bandwidth part set includes the determined bandwidth part.

The communications system can support a plurality of carrier bandwidths (CBW), such as a CBW 1 and a CBW 2. Certainly, in the communications system, the base station configures a carrier bandwidth for a current cell. For example, the base station configures a carrier bandwidth of 100 MHz for a cell 1, and configures a carrier bandwidth of 50 MHz for a cell 2. Correspondingly, the communications system can support different UE types. For example, the UE type may indicate a UE supporting a different subcarrier spacing, or a UE supporting a different UE BW (UE Bandwidth, a capability bandwidth of a terminal device). The capability bandwidth of the terminal device refers to a maximum bandwidth part supported by the UE. For example, a UE BW of a UE 1 is 5 MHz, and a UE BW of a UE 2 is 10 MHz.

Figure 5:
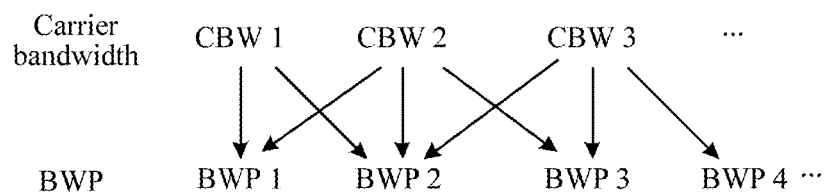
FIG. 5 is a schematic diagram of pre-configuring a BWP for each carrier bandwidth in a communications system according to an embodiment of this application.
Figure 6:
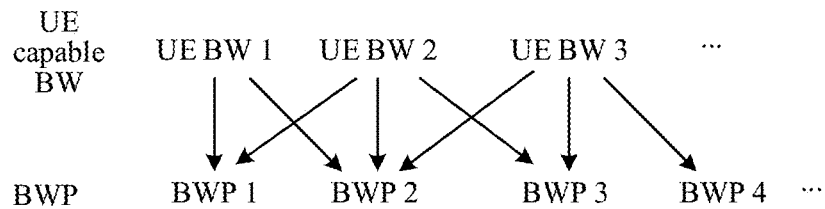
FIG. 6 is a schematic diagram of pre-configuring a BWP for each UE BW in a communications system according to an embodiment of this application.

In this embodiment of this application, one or more bandwidth parts (BWP) are pre-configured for each carrier bandwidth and/or UE BW supported in the communications system. FIG. 5 shows a case of configuring a BWP for each carrier bandwidth, for example, configuring a BWP 1 and a BWP 2 for a CBW 1, and configuring the BWP 1, the BWP 2, and a BWP 3 for a CBW 2. BWPs supported by different carrier bandwidths may partially overlap. For example, both the CBW 1 and the CBW 2 can support the BWP 1 and the BWP 2. FIG. 6 shows a case of configuring a BWP for each UE BW, for example, configuring a BWP 1 and a BWP 2 for a UE BW 1, and configuring the BWP 1, the BWP 2, and a BWP 3 for a UE BW 2. BWPs supported by different UE BWs may partially overlap. For example, both the UE BW 1 and the UE BW 2 can support the BWP 1 and the BWP 2. In this embodiment of this application, the one or more BWPs may be predefined or configurable, as shown in Table 1 and Table 2. Table 1 shows an example of configuring one or more BWPs for different carrier bandwidths, for example, configuring bandwidth parts of 5 MHz, 10 MHz, and 20 MHz for a CBW of 20 MHz. Table 2 shows an example of configuring one or more BWPs for different UE BWs, for example, configuring bandwidth parts of 5 MHz, 10 MHz, 20 MHz, and 40 MHz for a UE BW of 40 MHz. The predefinition means that sizes of available bandwidth parts in Table 1 or Table 2 may be pre-configured, and being configurable means that a set of selectable bandwidth parts in a case of a carrier bandwidth or a capability bandwidth of a UE in Table 1 or Table 2 may be configured, for example, configured in real time based on an actual case such as a type of a service between the base station and the UE. In addition, when initially accessing a network, all UEs receive synchronization signals on resources of synchronization bandwidths (synchronization signal bandwidth, SS bandwidth), for example, primary synchronization and secondary synchronization bandwidths in the communications system, where a size of a synchronization bandwidth may be related to a subcarrier spacing. Because a UE can receive information in a synchronization bandwidth, it may be considered that the SS bandwidth is a bandwidth that can be supported by the UE, and may be used to configure a BWP for a carrier bandwidth or a capability bandwidth of the UE.

TABLE 1

| Carrier bandwidth (CBW) | Bandwidth part (BWP) |
| --- | --- |
| 5 MHz | 5 MHz |
| 20 MHz | 5 MHz, 10 MHz, 20 MHz |
| 40 MHz | 5 MHz, 10 MHz, 20 MHz, 40 MHz |
| 100 MHz | 5 MHz, 10 MHz, 20 MHz, 40 MHz |
| . . . | . . . |
| 400 MHz | 20 MHz, 40 MHz, 80 MHz, 100 MHz |

TABLE 2

| Capability bandwidth of UE (UE BW) | Bandwidth part (BWP) |
| --- | --- |
| 5 MHz | 5 MHz |
| 20 MHz | 5 MHz, 10 MHz, 20 MHz |
| 40 MHz | 5 MHz, 10 MHz, 20 MHz, 40 MHz |
| 100 MHz | 5 MHz, 10 MHz, 20 MHz, 40 MHz |
| . . . | . . . |

In this way, a plurality of bandwidth parts are pre-configured for different carrier bandwidths and capability bandwidths of different terminal devices. When determining the bandwidth part of the terminal device, the base station determines, based on a pre-configured mapping relationship bandwidth part. This resolves a problem of adaptively selecting a bandwidth part based on a different carrier bandwidth or a different UE capability, and improves flexibility of determining a bandwidth part of a terminal device.

It should be noted that the bandwidths in Table 1 and Table 2 are expressed in a unit of MHz. Alternatively, the bandwidths may be expressed in a unit of a PRB corresponding to a particular subcarrier spacing, where one PRB includes 12 subcarriers. This embodiment of this application is described only by using an example that MHz is used as a unit.

Further, when determining a bandwidth part, the base station can determine the bandwidth part in a plurality of bandwidth parts, facilitating adaptive adjustment of a bandwidth part by the base station based on an actual requirement, for example, adjustment of a bandwidth part based on a different service type.

After obtaining the capability bandwidth of the UE, the base station determines the bandwidth part of the UE based on the first bandwidth part set corresponding to the first carrier bandwidth and/or the second bandwidth part set corresponding to the capability bandwidth of the UE that are in the pre-configured mapping relationships.

The mapping relationships configured by the base station may include mapping relationships between carrier bandwidths and bandwidth part sets, mapping relationships between capability bandwidths of UEs and bandwidth part sets, or a combination thereof. The three cases are separately described below.

In the first case, the base station configures the mapping relationships between carrier bandwidths and bandwidth part sets. In this case, the base station determines the bandwidth part in the first bandwidth part set based on the capability bandwidth of the terminal device.

For example, the first carrier bandwidth is the CBW 1 in FIG. 5, where the CBW 1 supports the BWP 1 and the BWP 2. The base station uses one of the BWP 1 and the BWP 2 as the bandwidth part based on the capability bandwidth of the UE. Table 1 is used as an example for description. If the first carrier bandwidth is 20 MHz, and the capability bandwidth of the UE that is obtained by the base station is 5 MHz, it may be learned from Table 1 that, a bandwidth part set supported by the first carrier bandwidth is (5 MHz, 10 MHz, 20 MHz). In this case, the base station may select 5 MHz from the bandwidth part set as the bandwidth part of the UE, where the bandwidth part determined by the base station should be less than or equal to the capability bandwidth of the UE.

In the second case, the base station configures the mapping relationships between capability bandwidths of terminal devices and bandwidth part sets. In this case, the base station determines any bandwidth part in the second bandwidth part set as the bandwidth part.

For example, the capability bandwidth of the UE is the UE BW 1 in FIG. 6, where the UE BW 1 supports the BWP 1 and the BWP 2. The base station uses one of the BWP 1 and the BWP 2 as the bandwidth part. Table 2 is used as an example for description. If the capability bandwidth of the UE obtained by the base station is 20 MHz, it may be learned from Table 2 that, a bandwidth part set supported by the capability bandwidth, namely, 20 MHz, of the UE is (5 MHz, 10 MHz, 20 MHz). In this case, the base station may select 5 MHz, 10 MHz, or 20 MHz from the bandwidth part set as the bandwidth part of the UE.

In the third case, the base station configures both of the mapping relationships. In this case, the base station determines the bandwidth part with reference to the foregoing two cases.

For example, the first carrier bandwidth is the CBW 1 in FIG. 5, where the CBW 1 supports the BWP 1 and the BWP 2, the capability bandwidth of the UE is the UE BW 3 in FIG. 6, where the UE BW 3 supports the BWP 2, the BWP 3, and the BWP 4, and both the CBW 1 and the UE BW 3 support the BWP 2. In this case, the base station determines the BWP 2 as the bandwidth part. Table 1 and Table 2 are used as an example for description. If the first carrier bandwidth is 40 MHz, and the capability bandwidth of the UE that is obtained by the base station is 20 MHz, it may be learned from Table 1 that, a first bandwidth part set supported by the first carrier bandwidth is (5 MHz, 10 MHz, 20 MHz, 40 MHz), and it may be learned from Table 2 that, a second bandwidth part set supported by the capability bandwidth, namely, 20 MHz, of the UE is (5 MHz, 10 MHz, 20 MHz). In this case, an intersection set of the first bandwidth part set and the second bandwidth part set (5 MHz, 10 MHz, 20 MHz). The base station may select a bandwidth part from the intersection set as the bandwidth part of the UE, for example, select 5 MHz, 10 MHz, or 20 MHz as the bandwidth part of the UE.

S402. The base station sends first indication information to the terminal device, where the first indication information is used to indicate the determined bandwidth part.

In one embodiment, the base station sends the first indication information to the terminal device, and the terminal device may determine, according to an indication in the first indication information, a frequency domain position, in the first carrier bandwidth, of the bandwidth part determined by the base station. The first indication information may include indication information used to indicate a start position, in the first carrier bandwidth, of a bandwidth part unit (BWP unit) in the bandwidth part and information used to indicate a size of the bandwidth part. In this application, the bandwidth part may include a series of bandwidth part units. The bandwidth part unit represents a granularity of a frequency domain resource occupied by the bandwidth part in a carrier bandwidth. The bandwidth part unit may be, for example, an RBG, an SS bandwidth, or a PRB, but this is not limited in this application. Actual resources corresponding to BWP units have different sizes, so that the indication information corresponds to different granularities. In this way, when the base station indicates the bandwidth part of the UE, different degrees of indication precision may be obtained, for example, an RBG may include a plurality of PRBs. If the base station uses a PRB as a BWP unit to indicate the frequency domain position of the bandwidth part, the base station indicates a frequency domain position of a PRB. If the base station uses an RBG as a BWP unit to indicate the frequency domain position of the bandwidth part, the base station indicates a frequency domain position of a RBG. In a two-level user resource allocation indication method, an RBG is used as a scheduling unit when a scheduled resource block in the bandwidth part is indicated. Therefore, to be better compatible with the second operation of the resource allocation, an RBG is preferably selected as the bandwidth part unit.

That the bandwidth part unit is an RBG is used as an example. When the base station indicates the frequency domain position of the bandwidth part, the first carrier bandwidth includes several RBGs whose numbers are, for example, 0, 1, . . . , and 16. The base station needs to use [log U] (where "[]" indicates rounding up, log U indicates a logarithm of U, and U indicates a quantity of RBGs in a carrier bandwidth) bits to indicate a start RBG of the bandwidth part. For example, 00000 indicates that a start RBG of the bandwidth part in the first carrier bandwidth is 0. In this case, the bandwidth part is a bandwidth part that is of the first carrier bandwidth and whose start RBG number is 0. In addition, a size of the determined bandwidth part, for example, 10 MHz, is indicated to the UE. Therefore, the frequency domain position. of the bandwidth part in the first carrier bandwidth may be determined. It should be noted that the frequency domain position of the bandwidth part in the first carrier bandwidth is determined by determining a start position of the bandwidth part unit, for example, the RBG, is merely an example. A person skilled in the art may understand that, the frequency domain position of the bandwidth part in the first carrier bandwidth may alternatively be determined by determining a middle position, an end position, or another position of the bandwidth part unit, for example, the RBG. This is not limited in this application.

In one embodiment, the base station may add the first indication information to first signaling, where the first signaling may be, for example, RRC signaling or DCI signaling. That is, the base station may add, to a piece of signaling, the information included in the first indication information.

In one embodiment, the base station may alternatively add, to second signaling, the indication information that is used to indicate the start position of the RBG and that is included in the first indication information, where the second signaling may be, for example, RRC signaling or DCI signaling, and add, to third signaling, the information that is used to indicate the size of the bandwidth part and that is included in the first indication information, where the third signaling may be, for example, RRC signaling or DCI signaling. The second signaling is different from the third signaling. That is, the base station may add, to a plurality of pieces of signaling, the information included in the first indication information.

In one embodiment, if the UE reports the capability bandwidth of the UE in a random access process established with the base station, the base station may add the first indication information to a message 2 (Msg2) and/or a message 4 (Msg4) in the random access process. A manner of adding the first indication information to the Msg2 and/or the Msg4 by the base station is similar to that described above, and details are not described herein again. In one embodiment, if the base station obtains the capability bandwidth of the UE by using a preamble sent by the UE, the base station may add the first indication information to a random access response (RAR), to indicate the frequency domain position of the bandwidth part in the first carrier bandwidth to the UE. If the base station indicates the frequency domain position of the bandwidth part in the first carrier bandwidth by using a control channel of the RAR, the base station may send the RAR by using the determined bandwidth part. If the base station indicates the frequency domain position of the bandwidth part in the first carrier bandwidth by using a data channel of the RAR, the base station may send the RAR by using a predefined bandwidth part, and send the Msg4 on the determined bandwidth part.

If the base station obtains the capability bandwidth of the UE by using Msg3 sent by the UE, the base station may indicate the frequency domain position of the bandwidth part in the first carrier bandwidth by using the Msg4. If the base station indicates the frequency domain position of the bandwidth part in the first carrier bandwidth by using a control channel of the Msg4, the base station may send the Msg4 by using the determined bandwidth part. If the base station indicates the frequency domain position of the bandwidth part in the first carrier bandwidth by using a data channel of the Msg4, the base station may send the Msg4 by using a predefined bandwidth part.

Figure 9:
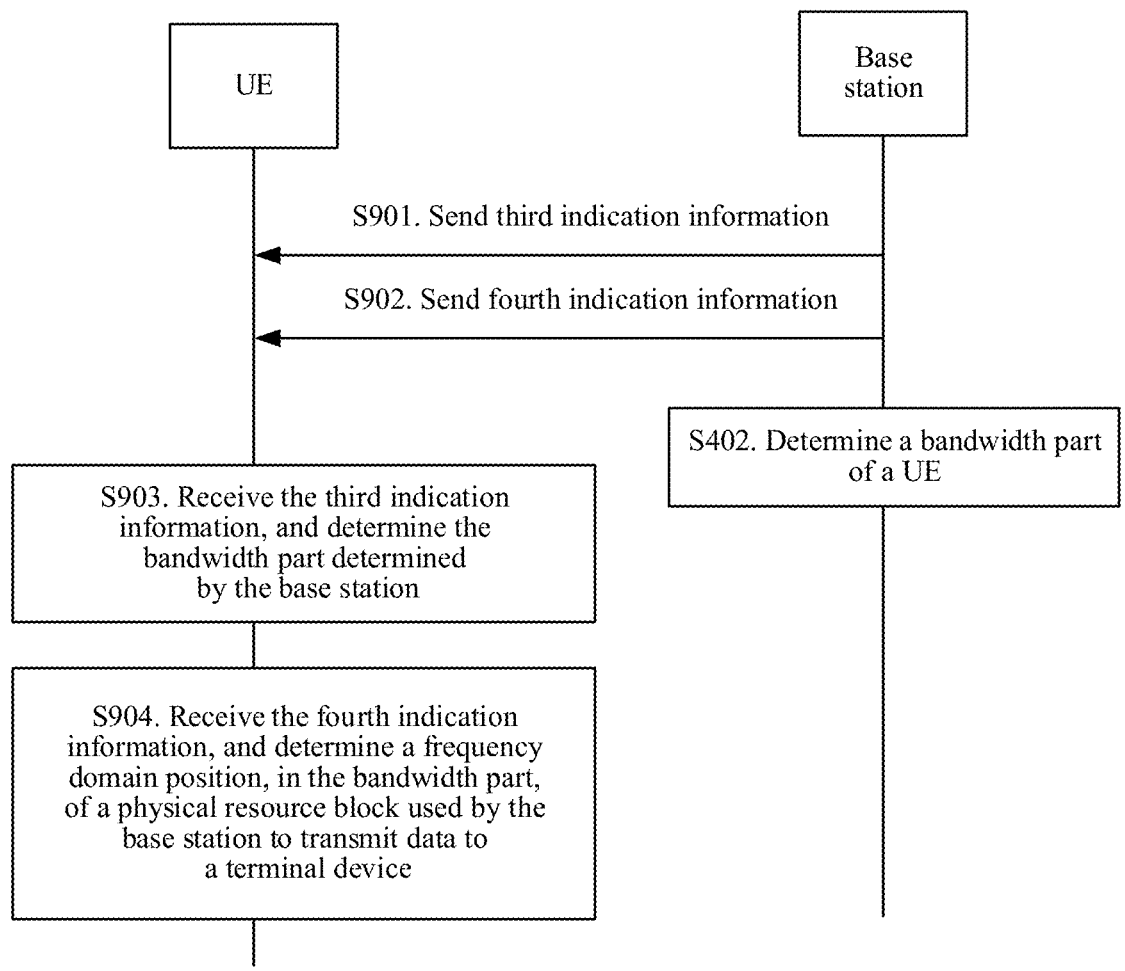
FIG. 9 is a schematic diagram of a method for indicating a bandwidth part according to an embodiment of this application.

In one embodiment, an embodiment of this application further provides another method 900 for indicating the bandwidth part. Referring to FIG. 9, the method may alternatively be used to indicate the bandwidth part to the UE in S402 in the method 400. The method includes the following operations.

S901. The base station sends third indication information to the terminal device, where the third indication information is used to indicate, to the terminal device, the frequency domain position, in the first carrier bandwidth, of the bandwidth part determined by the base station, and the bandwidth part includes a plurality of bandwidth part units.

S902. The base station sends fourth indication information to the terminal device, where the fourth indication information is used to indicate a frequency domain position of a scheduled physical resource block in the bandwidth part.

The method may be used by the base station to determine the bandwidth part in S402. In one embodiment, the first indication information includes the third indication information and the fourth indication information.

S903. The terminal device receives the third indication information, and determines, according to the third indication information, the bandwidth part determined by the base station.

S904. The terminal device receives the fourth indication information, and determines, according to the fourth indication information, the frequency domain position of the scheduled physical resource block in the bandwidth part.

In one embodiment, the bandwidth part includes a plurality of bandwidth part units, the first indication information includes the third indication information, and the sending, by the base station, the first indication information to the terminal device includes: sending, by the base station, the third indication information to the terminal device, where the third indication information is used to indicate, to the terminal device, the frequency domain position of the bandwidth part in the first carrier bandwidth; and sending, by the base station, the fourth indication information to the terminal device, where the fourth indication information is used to indicate the frequency domain position of the scheduled physical resource block in the bandwidth part.

In one embodiment, the third indication information may be a resource indication value (RIV) or a valid value of each frequency domain position in a bitmap manner, thereby implementing that the bandwidth part is consecutively distributed in the frequency domain position occupied in the carrier bandwidth. The third indication information may be a combinatorial index r value in a type 1 in two resource allocation types for an uplink physical channel PUSCH or a valid value of each frequency domain position in a bitmap manner, thereby implementing that the bandwidth part is non-consecutively distributed in the frequency domain position occupied in the carrier bandwidth.

That the BWP unit is an RBG is used as an example, and downlink data transmission is used as an example. The base station may calculate an RIV value based on a formula (1) and a formula (2), thereby indicating a start position and a size of the BWP in an RBG of the carrier bandwidth by using the RIV value.

$$\text{If } (L_{CRBGs}-1) \le \lfloor N_{RBG}^{DL}/2 \rfloor, \text{RIV}=N_{RBG}^{DL}(L_{CRBGs}-1)+\text{RBG}_{start}. \quad (1)$$

$$\text{If } (L_{CRBGs}-1) > \lfloor N_{RBG}^{DL}/2 \rfloor, \text{RIV}=N_{RBG}^{DL}(N_{RBG}^{DL}-L_{CRBGs}-1)+(N_{RBG}^{DL}-1-\text{RBG}_{start}). \quad (2)$$

$L_{CRBGs}$ is a length of an RBG in a carrier bandwidth, $N_{RBG}^{DL}$ is a quantity of downlink RBGs in the carrier bandwidth, $\text{RBG}_{start}$ is a start value, in one embodiment, an index value of a start RBG in which the bandwidth part is located in the carrier bandwidth.

Alternatively, the base station may calculate, by using a formula (3), a combinatorial index r value in a manner of an uplink resource allocation type 1, thereby indicating, by using the r value, an index $s_0$ of a start RBG and an index $s_1-1$ of an end RBG in an RBG set 1 in which the BWP is located in the carrier bandwidth, and indexes $s_2$ and $s_3-1$ of a start RBG and an end RBG in an RBG set 2 in the carrier bandwidth, where $$r = \sum_{i=0}^{M-1} \binom{N-s_i}{M-i} \quad (3)$$

where M=4, N=$\lceil N_{RB}^{DL}/P \rceil$+1, $N_{RB}^{DL}$ is a quantity of downlink RBGs, P is a quantity of RBs included in an RBG, and $N_{RB}^{DL}/P$ indicates a total quantity of RGBs in a carrier bandwidth.

Alternatively, the base station informs the frequency domain position of the bandwidth part of the UE by using a bitmap sequence in a bitmap manner, where each frequency domain position uses an RBG as a granularity, 0 represents that the RBG is valid, and 1 represents that the RBG is invalid. For example, the bitmap sequence is "0011010". Bit values of the first RBG, the second RBG, the fifth RBG, and the seventh RBG are 0. It indicates that the foregoing RBGs are not RBGs in which the bandwidth part of the UE is located. Bit values of the third RBG, the fourth RBG, and the sixth RBG are 1. It indicates that the three RBGs form the bandwidth part of the UE.

When the BWP unit is an SS bandwidth or a PRB, manners are similar to the foregoing descriptions, and details are not described herein again.

In one embodiment, both the third indication information and the fourth indication information may be carried in fourth signaling. The fourth signaling may be, for example, DCI signaling. This is not limited in this application.

In one embodiment, the third indication information and the fourth indication information may be carried in different signaling. For example, the third indication information may be carried in fifth signaling, and the fourth indication information may be carried in sixth signaling. The fifth the signaling may be, for example, RRC signaling, and the sixth signaling may be, for example, DCI signaling. This is not limited in this application.

It should be noted that when the third indication information and the fourth indication information are sent by using different signaling, S901 and S902 are performed in any sequence, and S903 and S904 are performed in any sequence. That is, S901 may be performed before or after S902 is performed. Likewise, S903 may be performed before or after S904 is performed.

When the base station sends the third indication information, the third indication information is carried on a resource in a common search space (CSS) of a control channel or carried on a resource in a UE specific search space (USS). The CSS is used to carry common control information of the cell, and the USS is used to carry user specific control information. Various embodiments of this application are described by using names of the "CSS" and the "USS" as an example, but are not limited thereto. In one embodiment, names are determined based on functions of the "CSS" and the "USS". In this embodiment of this application, the control channel may be a physical downlink control channel (PDCCH) in an NR system, a new radio physical downlink control channel (NR-PDCCH), or a control channel used to perform a same or similar function in an NR system, such as a group common control channel (GCCCH), a physical control format indicator channel-like channel (PCFICH-like Channel), or a physical layer broadcast channel (L1 Broadcast Channel). This is not limited in this application.

In one embodiment, the frequency domain position of the bandwidth part of the UE in the first carrier bandwidth may not overlap with the position of the resource in the CSS or the position of the resource in the USS. In this case, the base station sends the third indication information to the terminal device by using the control channel in a first time domain position. After receiving the third indication information in the first time domain position the UE determines the frequency domain position of the bandwidth part in the first carrier bandwidth according to the third indication information.

Figure 7:
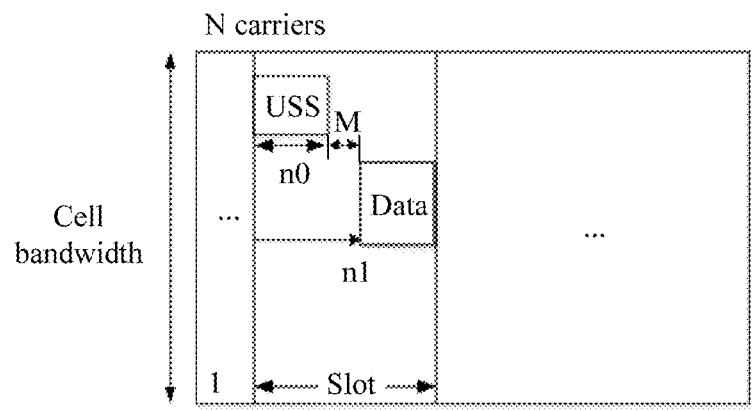
FIG. 7 is a schematic diagram of sending, by a base station, in a first time domain position, fourth indication information to a terminal device by using a control channel and sending data in a second time domain position when a frequency domain position of a bandwidth part of a UE in a first carrier bandwidth does not overlap with a position of a resource in a US S according to an embodiment of this application.
Figure 8:
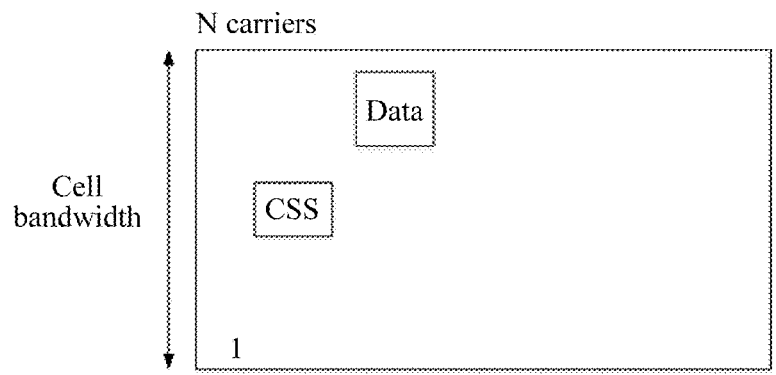
FIG. 8 is a schematic diagram of sending, by a base station, in a first time domain position, fourth indication information to a terminal device by using a control channel and sending data in a second time domain position when a frequency domain position of a bandwidth part of a UE in a first carrier bandwidth does not overlap with a position of a resource in a CSS according to an embodiment of this application.

After sending the third indication information in the first time domain position, as shown in FIG. 7, the base station sends, on the determined bandwidth part, data in a second time domain position after the first time domain position by using the resource indicated in the USS; or as shown in FIG. 8, the base station sends, on the determined bandwidth part, data in a second time domain position after the first time domain position by using the resource indicated in the CSS.

In this embodiment of this application, a position difference between the first time domain position and the second time domain position is set to one or more OFDM symbols, where the position difference is represented by M, as shown in FIG. 7, where M is an integer greater than or equal to 1, for example, M=2. A value of M may be pre-agreed with the UE, or may be indicated in the third indication information to the UE. The first time domain position and the second time domain position belong to one scheduling unit in time domain, and the last OFDM symbol included in the first time domain position and the first OFDM symbol included in the second time domain position are separated by M OFDM symbols. In this way, the base station learns that n OFDM symbols are occupied by the position of the resource in the common search space (CSS) of the control channel or the position of the resource in the UE specific search space (USS) in time domain. In this way, a start time of the corresponding data channel in time domain is n+M OFDM symbols. In this way, a start position of the data channel in time domain can be accurately determined, thereby improving accuracy of data exchange between the base station and the terminal device. Therefore, it is ensured that the UE receives data in a time domain position in which the base station sends the data thereby ensuring integrity of the received data.

In one embodiment, before operation S401, the method 400 may further include operation S403.

S403. The terminal device sends, to the base station, second indication information used to indicate the capability bandwidth of the terminal device.

In this embodiment of this application, before the base station determines the bandwidth part of the UE, the UE may report the capability bandwidth of the UE to the base station. Before the base station determines the bandwidth part of the UE, the UE sends the second indication information to the base station. In this case, the base station receives the second indication information. The second indication information is used to indicate the capability bandwidth of the UE.

In one embodiment, the second indication information may be radio resource control (RRC) signaling. In this way, after the base station establishes an RRC connection to the terminal device, the UE sends RRC signaling to the base station, where the RRC signaling carries capability information of the UE. The base station obtains the capability bandwidth of the UE by using the capability information of the UE that is carried in the RRC signaling.

In one embodiment, the second indication information may be information sent to the base station in the random access process between the base station and the UE. For example, when sending preamble information to the base station, the UE adds a UE capability to the preamble information. The base station obtains the capability bandwidth of the UE by using the preamble information sent by the UE. Alternatively, the UE sends a message 3 (Msg3) by using an uplink data channel in the random access process established with the base station, and adds a UE capability to the Msg3. The base station obtains the capability bandwidth of the UE by using the Msg3 message.

A format of signaling carrying the second indication information is not limited in this application.

It should be noted that, the foregoing operation is optional. That is, the reporting, by the terminal device, the capability bandwidth of the UE to the base station is an optional process, and is not necessarily performed. The base station may obtain the capability bandwidth of the UE in another manner.

In one embodiment, to indicate the frequency domain position of the bandwidth part of the UE, in this embodiment of this application, the method 400 further includes: S404. Determine a subcarrier spacing used to indicate the bandwidth part of the UE.

In one embodiment, the base station may determine, before indicating the bandwidth part to the UE, the subcarrier spacing used to indicate the bandwidth part of the UE.

For example, the base station determines the subcarrier spacing after configuring the first carrier bandwidth for the cell or at the same time when the bandwidth part is determined. This is not limited in this application.

It should be noted that the base station may indicate the frequency domain position of the bandwidth part of the UE by using a particular subcarrier spacing, for example, using a reference subcarrier spacing (15 kHz).

In this embodiment of this application, a resource configuration method is provided. The method may be used by the base station to determine the subcarrier spacing used to indicate the bandwidth part of the UE.

In the method, the base station determines, based on mapping relationships between carrier bandwidths and subcarrier spacings, a first subcarrier spacing used for resource configuration in a first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing; and the base station configures a resource for the terminal device based on the determined first subcarrier spacing.

In one embodiment, the first carrier bandwidth belongs to a first carrier bandwidth range, and a subcarrier spacing used for resource configuration in each carrier bandwidth included in the first carrier bandwidth range is the first subcarrier spacing.

In one embodiment, the first carrier bandwidth can support a plurality of subcarrier spacings, and the plurality of subcarrier spacings include the first subcarrier spacing.

In this embodiment of this application, a given carrier bandwidth supports a finite set of subcarrier spacings. In this way, the mapping relationships between carrier bandwidths and subcarrier spacings may be that one carrier bandwidth corresponds to one subcarrier spacing set. When determining a subcarrier spacing, the base station may determine the subcarrier spacing in a corresponding subcarrier spacing set based on an actual situation, for example, to minimum signaling overheads, select a maximum subcarrier spacing from the subcarrier spacing set; or select an appropriate subcarrier spacing based on an actual service type, thereby flexibly configuring the subcarrier spacing.

The resource configuration method is described in detail below.

The base station pre-configures the mapping relationships between carrier bandwidths and subcarrier spacings, where the mapping relationships include different subcarrier spacings and a carrier bandwidth corresponding to each subcarrier spacing. For example, the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing. The base station can determine, in the mapping relationships, the subcarrier spacing used to indicate the resource configuration. For a plurality of base stations having different carrier bandwidths, each base station may select an appropriate subcarrier spacing based on the carrier bandwidth of the base station, to configure a resource. This avoids a signaling overhead problem caused by using a small subcarrier spacing to configure a resource in a case of a large carrier bandwidth, thereby reducing signaling overheads during the resource configuration.

Further, a subcarrier spacing used when the terminal device determines the frequency domain position may be implicitly indicated by binding a carrier bandwidth with a subcarrier spacing used when a resource is configured. For example, when a carrier is divided into sub-bands with different subcarrier spacings, the subcarrier spacings are used to indicate frequency domain positions in the different sub-bands, or indicate frequency domain positions of first-level resources during two-level resource allocation indication. That is, after a carrier bandwidth of the base station is configured, a subcarrier spacing of the base station is also configured. Alternatively, a subcarrier spacing used when the terminal device configures a resource may be explicitly indicated by binding a carrier bandwidth with the subcarrier spacing used when the resource is configured. For example, when a base station side broadcasts a carrier bandwidth, subcarrier spacings of a resource block RB are divided, and are explicitly notified to a terminal side by using a master information block (MIB) or a synchronization signal block (SS block).

The mapping relationships between carrier bandwidths and subcarrier spacings include but are not limited to the following two cases:

First, the mapping relationships may be mapping relationships between carrier bandwidth ranges and subcarrier spacings (SCS). For example, for a single subcarrier spacing, a maximum quantity of subcarriers in a carrier bandwidth may be 3300 or 6600. For a same carrier bandwidth, a different maximum quantity of subcarriers in the carrier bandwidth indicates that subcarrier spacings corresponding to a same carrier bandwidth range may be different. Table 3 shows a mapping relationship between a carrier bandwidth range and a subcarrier spacing when the maximum quantity of subcarriers is 3300, where a subcarrier spacing corresponding to an interval (100, 200] is 60 kHz. Table 4 a mapping relationship between a carrier bandwidth range and a subcarrier spacing when the maximum quantity of subcarriers is 6600, where a subcarrier spacing corresponding to an interval (100, 200] is 30 kHz.

TABLE 3

| | BW (MHz) | | | |
|---|---|---|---|---|
| | ≤50 | (50, 100] | (100, 200] | (200, 400] |
| SCS (kHz) | 15 | 30 | 60 | 120 |

TABLE 4

| | BW (MHz) | | |
|---|---|---|---|
| | <100 | (100, 200] | (200, 400] |
| SCS (kHz) | 15 | 30 | 60 |

For example, when the maximum quantity of subcarriers is 3300, if the carrier bandwidth of the base station is 80 MHz, which is between 50 MHz and 100 MHz, 30 kHz may be used as a subcarrier spacing for configuring a resource on the carrier bandwidth of the base station of. The carrier bandwidth of the base station includes approximately 200 PRBs. It is assumed that a resource allocation type 2 in LTE is used. It can be learned from a formula $\log_2 (N_{RB}^{DL} (N_{RB}^{DL}+1)/2)$ that, maximum overheads of signaling during resource allocation are 15 bits, where $N_{RB}^{DL}$ is a quantity of downlink RBs.

Division of bandwidth ranges in Table 3 and Table 4 is also related to a guard band that is of a bandwidth in a carrier and that is set to prevent interference between subcarriers. Therefore, bandwidth division in Table 3 and Table 4 is merely an example, and another type of division is not excluded.

Second, the mapping relationships may be mapping relationships between carrier bandwidths and subcarrier spacing sets supported by the corresponding carrier bandwidths, as shown in Table 5.

TABLE 5

| | BW (MHz) | | | | | | | |
|---|---|---|---|---|---|---|---|---|
| | 5 | 20 | 40 | 80 | 100 | 160 | 200 | 320 |
| SCS set (kHz) | 15, 30, 60 | 15, 30, 60 | 15, 30, 60 | 30, 60, 120 | 60, 120 | 60, 120, 240 | 120, 240 | 240, 480 |
| SCS (kHz) | 60 | 60 | 60 | 120 | 120 | 240 | 240 | 480 |

For a given carrier bandwidth, a subcarrier spacing set supported by the carrier bandwidth should be an infinite set. The infinite set is, for example, a subset of a subcarrier spacing set {3.75 kHz, 7.5 kHz, 15 kHz, 30 kHz, 60 kHz, 120 kHz, 240 kHz, 480 kHz}.

For example, for a scenario including a plurality of subcarrier spacings, for a single subcarrier spacing, if a maximum quantity of subcarriers of each carrier is 3300, and a subcarrier spacing f0 is a minimum value in a subcarrier spacing set and satisfying that f0*3300 is not less than a given carrier bandwidth B1, f0 and f0*2^N (N>0) may be applicable to the carrier bandwidth. For example, if a given carrier bandwidth is 80 MHz, f0=30 kHz is a minimum value satisfying f0*3300≥80 MHz. In this case, all other extended subcarrier spacings f0*2^N (N>0) may be applicable to the carrier bandwidth, or an intersection set of extended subcarrier spacings f0*2^N (N>0) and an available subcarrier spacing set for the carrier band may be applicable to the carrier bandwidth. If a maximum quantity of subcarriers of each carrier is 6600, the foregoing rule is also applicable, making only f0*6600 not less than a bandwidth B2. In one embodiment, for a plurality of subcarrier spacings, a total quantity of subcarriers of a carrier may be less than or equal to M, where M is 6600 or 9900. For example, a value of M is 6600. A quantity of subcarriers of 15 kHz of a carrier is 3300, and a quantity of subcarriers of 30 kHz is 1650. In this case, a total quantity of subcarriers of the carrier is 4950, which is less than 6600.

Table 5 is used as an example for description. If the carrier bandwidth of the base station is 40 MHz, and assuming that a subcarrier spacing set supported by the carrier bandwidth is {15 kHz, 30 kHz, 60 kHz}, the base station can randomly select one subcarrier spacing from the subcarrier spacing set as a subcarrier spacing for the carrier bandwidth of the base station. Alternatively, to maximally reducing signaling overheads, the base station can select the maximum subcarrier spacing of 60 kHz from the subcarrier spacing set as the subcarrier spacing for the carrier bandwidth of the base station. In this case, Table 5 may be simplified into Table 6. That is, a subcarrier spacing for each carrier bandwidth is a maximum subcarrier spacing supported by the carrier bandwidth. Certainly, this embodiment of this application imposes no limitation on a subcarrier spacing selected by the base station from the subcarrier spacing set. The base station side may alternatively directly determine the subcarrier spacing according to Table 6. For example, when the carrier bandwidth is 40 MHz, a subcarrier spacing used for resource allocation on the carrier bandwidth is 60 kHz.

TABLE 6

| | BW (MHz) | | | | | | | |
|---|---|---|---|---|---|---|---|---|
| | 5 | 20 | 40 | 80 | 100 | 160 | 200 | 320 |
| SCS (kHz) | 60 | 60 | 60 | 120 | 120 | 240 | 240 | 480 |

It should be noted that in this application, the mapping relationships between carrier bandwidths and subcarrier spacings shown in Table 3 to Table 6 are examples, and are not intended to limit this application.

It should be noted that, the manner of determining the subcarrier spacing by the base station may be agreed with the UE in advance. Alternatively, the manner of determining the subcarrier spacing may be carried in a system message or an indication message and sent to the UE.

S405. The terminal device receives the first indication information sent by the base station.

S406. The terminal device determines, according to the first indication information, the bandwidth part determined by the base station.

After receiving the first indication information that is sent by the base station and that indicates the bandwidth part, the UE determines, according to the indication information, the frequency domain position of the bandwidth part in the first carrier bandwidth, in one embodiment, determines the frequency domain position of the bandwidth part based on the subcarrier spacing. It should be noted that, the UE may determine the frequency domain position of the bandwidth part by using a subcarrier spacing agreed with the base station, or may determine the frequency domain position of the bandwidth part by using a subcarrier spacing determining method carried in the indication information. The subcarrier spacing determining manner used by the UE is the same as the determining manner used by the base station. The following describes two embodiments of determining the subcarrier spacing by the UE.

In one embodiment, the UE determines the frequency domain position of the bandwidth part of the UE by using a default subcarrier spacing, for example, by using a reference subcarrier spacing (15 kHz).

In one embodiment, the base station pre-configures the mapping relationships between carrier bandwidths and subcarrier spacings, where the mapping relationships include different subcarrier spacings and a carrier bandwidth corresponding to each subcarrier spacing. For example, the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing. For the UE, when the UE initially accesses a network, or after the UE establishes an RRC connection to the base station, or in a random access process established with the base station, the base station indicates the configured carrier bandwidth to the UE, so that UE determines the subcarrier spacing of the bandwidth part based on the carrier bandwidth indicated by the base station and the pre-configured mapping relationships.

The method used by the UE to determine the subcarrier spacing is the same as that in S404, and details are not described herein again.

After obtaining the subcarrier spacing, the UE determines the frequency domain position of the bandwidth part according to the indication information, where a determining process of the UE is a reverse process of S401 and S402, and details are not described herein again. The following provides brief descriptions by using an example in which the base station indicates the bandwidth part of the UE by using a BWP unit.

After determining the subcarrier spacing used by the base station to indicate the bandwidth part, the UE determines the frequency domain position of the bandwidth part based on the subcarrier spacing.

If the third indication information received by the UE is RIV, the UE calculates, based on the RIV and the formulas (1) and (2), a start position and a quantity in the bandwidth part in the carrier bandwidth.

If the third indication information received by the UE is an r value, the UE calculates, based on the r value and the formula (3), a start position and a quantity in the bandwidth part in the carrier bandwidth.

If the third indication information received by the UE is a bitmap, the UE determines the bandwidth part based on a bit value of each RBG. For example, the bit mapping sequence received by the UE is "0011010". Because bit values of the first RBG, the second RBG, the fifth RBG, and the seventh RBG are 0, it is determined that the third RBG, the fourth RBG, and the sixth RBG are the frequency domain position of the bandwidth part of the UE in the carrier bandwidth.

Figure 10:
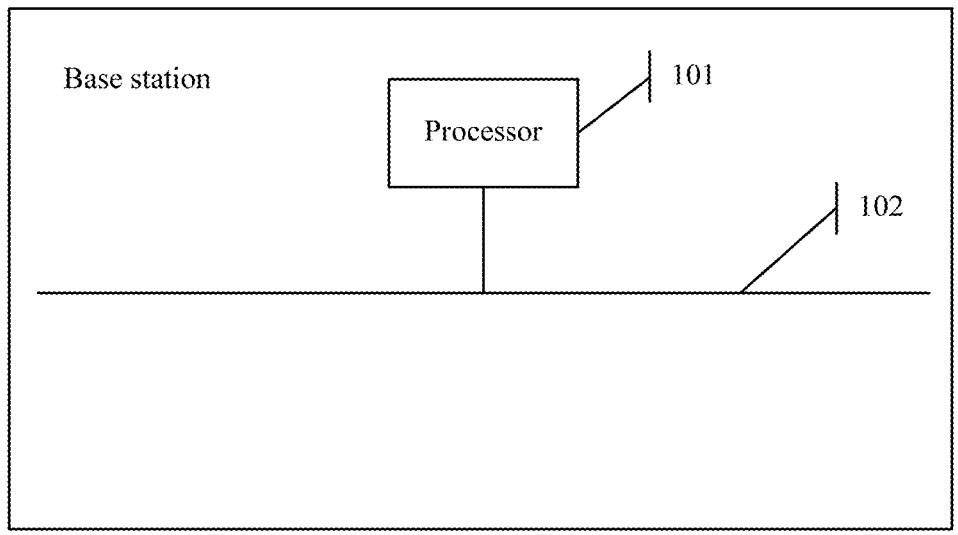
FIG. 10 to FIG. 12 are schematic structural diagrams of a base station according to embodiments of this application.

Referring to FIG. 10, an embodiment of this application provides a base station, which may be configured to perform the methods in the embodiments of this application. The base station includes a processor 101.

The processor 101 may be a central processing unit (CPU), an application-specific integrated circuit (ASIC), one or more integrated circuits configured to control program execution, a baseband chip, or the like.

The base station may further include a memory. The memory may be connected to the processor 101 by using a bus 102. There may be one or more memories. The memory may be a read-only memory (ROM), a random access memory (RAM), a magnetic disk memory, or the like. The memory may be configured to store program code required by the processor 101 to perform a task, and the memory may further be configured to store data.

The processor 101 is configured to determine, based on mapping relationships between carrier bandwidths and subcarrier spacings, a first subcarrier spacing used for resource configuration in a first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing.

The processor 101 is further configured to configure a resource for a terminal device based on the determined first subcarrier spacing.

In one embodiment, the first carrier bandwidth belongs to a first carrier bandwidth range, and a subcarrier spacing used for resource configuration in each carrier bandwidth included in the first carrier bandwidth range is the first subcarrier spacing.

In this embodiment of this application, the first carrier bandwidth can support a plurality of subcarrier spacings, and the plurality of subcarrier spacings include the first subcarrier spacing.

Code corresponding to the foregoing resource configuration method is burned into a chip by designing and programming the processor 101, so that the chip can perform the foregoing resource configuration method during operation. How to design and program the processor 101 is a technology known to a person skilled in the art, and details are not described herein.

Figure 11:
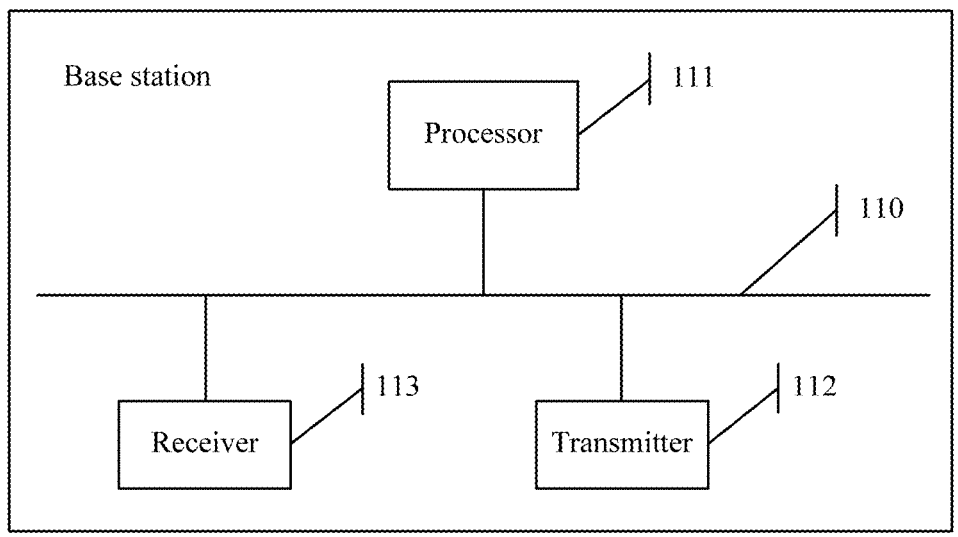

Referring to FIG. 11, an embodiment of this application provides a base station. The base station includes a processor 111 and a transmitter 112. The processor 111 and the transmitter 112 may be connected by using a system bus 110.

The processor 111 may be a central processing unit (CPU), an application-specific integrated circuit (ASIC), one or more integrated circuits configured to control program execution, a baseband chip, or the like.

The transmitter 112 may be connected to the processor 111 by using the system bus 110 (as shown in FIG. 11), or may be connected to the processor 111 by using a special connection cable.

The base station may further include a memory. The memory may be connected to the processor 111 by using the system bus 110. There may be one or more memories. The memory may be a read-only memory (ROM), a random access memory (RAM), a magnetic disk memory, or the like. The memory may be configured to store program code required by the processor 111 to perform a task, and the memory may further be configured to store data.

The processor 111 is configured to determine a bandwidth part based on a mapping relationship between a first carrier bandwidth and a first bandwidth part set and/or a mapping relationship between a capability bandwidth of a terminal device and a second bandwidth part set.

The first bandwidth part set includes a plurality of bandwidth parts, the first bandwidth part set includes the determined bandwidth part, the second bandwidth part set includes a plurality of bandwidth parts, and the second bandwidth part set includes the determined bandwidth part.

The transmitter 112 is configured to send first indication information to the terminal device, where the first indication information is used to indicate the determined bandwidth part.

In one embodiment, the base station further includes:
a receiver 113, configured to receive second indication information sent by the terminal device, where the second indication information is used to indicate the capability bandwidth of the terminal device.

In this embodiment of this application, the processor 111 is configured to:
determine the bandwidth part in the first bandwidth part set, where the bandwidth part is less than or equal to the capability bandwidth of the terminal device.

In one embodiment, the processor 111 is configured to:
determine any bandwidth part in the second bandwidth part set as the bandwidth part.

In one embodiment, the transmitter 112 is further configured to:
send third indication information to the terminal device, where the third indication information is used to indicate a frequency domain position of the bandwidth part in the first carrier bandwidth to the terminal device, and the determined bandwidth part includes one or more bandwidth part units; and send fourth indication information to the terminal device, where the fourth indication information is used to indicate a frequency domain position of a scheduled physical resource block in the bandwidth part.

In one embodiment, the bandwidth part unit is a resource block group (RBG), a synchronization signal bandwidth (SS bandwidth), or a physical resource block (PRB).

In one embodiment, the third indication information is carried on a resource in a common search space of a control channel or a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space. The transmitter 112 is configured to:

send, in a first time domain position, the third indication information to the terminal device by using the control channel.

After the sending module sends the third indication information, the transmitter 112 is further configured to:

send, in a second time domain position, data to the terminal device by using the determined bandwidth part.

In this embodiment of this application, the first time domain position and the second time domain position belong to one scheduling unit in time domain, and the last OFDM symbol included in the first time domain position and the first OFDM symbol included in the second time domain position are separated by M OFDM symbols, where M is an integer greater than or equal to 1.

In one embodiment, the processor 111 is further configured to:

determine, based on mapping relationships between carrier bandwidths and subcarrier spacings, a first subcarrier spacing used for resource configuration in the first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing; and determine, based on the determined first subcarrier spacing, the frequency domain position of the determined bandwidth part in the first carrier bandwidth.

In one embodiment, the first carrier bandwidth belongs to a first carrier bandwidth range, and a subcarrier spacing used for resource configuration in each carrier bandwidth included in the first carrier bandwidth range is the first subcarrier spacing.

In one embodiment, the first carrier bandwidth can support a plurality of subcarrier spacings, and the plurality of subcarrier spacings include the first subcarrier spacing.

Code corresponding to the foregoing method for determining a bandwidth part is burned into a chip by designing and programming the processor 111, so that the chip can perform the foregoing method for determining a bandwidth part during operation. How to design and program the processor 111 is a technology known to a person skilled in the art, and details are not described herein.

Figure 12:
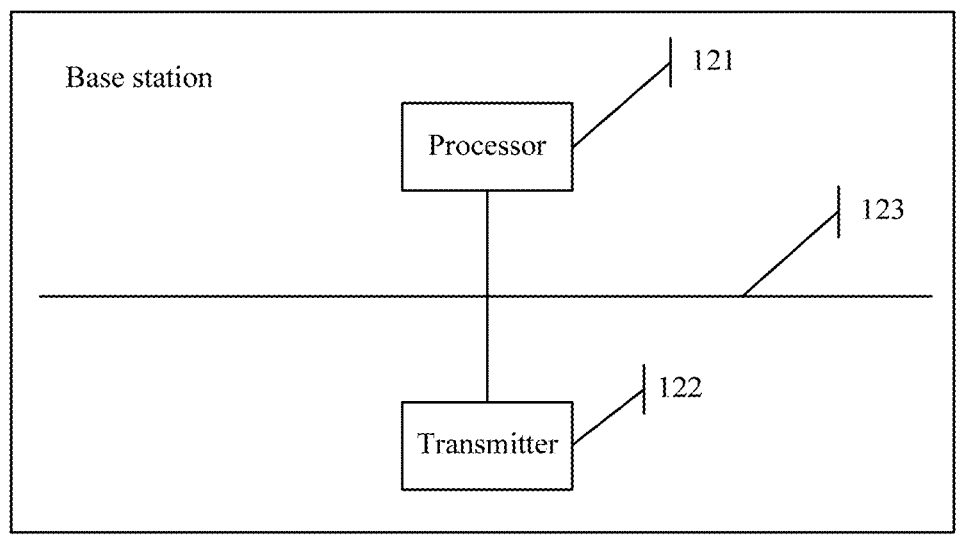

Referring to FIG. 12, an embodiment of this application provides a base station. The base station includes a processor 121 and a transmitter 122.

The base station may further include a memory. The memory may be connected to the processor 121 by using a bus 123. There may be one or more memories. The memory may be a read-only memory (ROM), a random access memory (RAM), a magnetic disk memory, or the like.

The processor 121 is configured to generate first indication information and second indication information, where the first indication information is used to indicate a frequency domain position, in a first carrier bandwidth, of a bandwidth part determined by the base station to the terminal device, the bandwidth part includes a plurality of bandwidth part units, and the second indication information is used to indicate a frequency domain position of a scheduled physical resource block in the bandwidth part.

The transmitter 122 is configured to send the first indication information and the second indication information to the terminal device.

In this embodiment of this application, the bandwidth part unit is a RBG, a SS bandwidth, or a PRB.

In this embodiment of this application, the first indication information is carried on a resource in a common search space of a control channel or a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space. The transmitter 122 is configured to:

send, in a first time domain position, the first indication information to the terminal device by using the control channel.

After the sending module sends the first indication information, the transmitter 122 is further configured to:

send, in a second time domain position, data to the terminal device by using the determined bandwidth part.

In this embodiment of this application, the first time domain position and the second time domain position belong to one scheduling unit in time domain, and the last OFDM symbol included in the first time domain position and the first OFDM symbol included in the second time domain position are separated by M OFDM symbols, where M is an integer greater than or equal to 1.

Code corresponding to the foregoing method for indicating a bandwidth part is burned into a chip by designing and programming the processor 121, so that the chip can perform the foregoing method for indicating a bandwidth part during operation. How to design and program the processor 121 is a technology known to a person skilled in the art, and details are not described herein.

Figure 13:
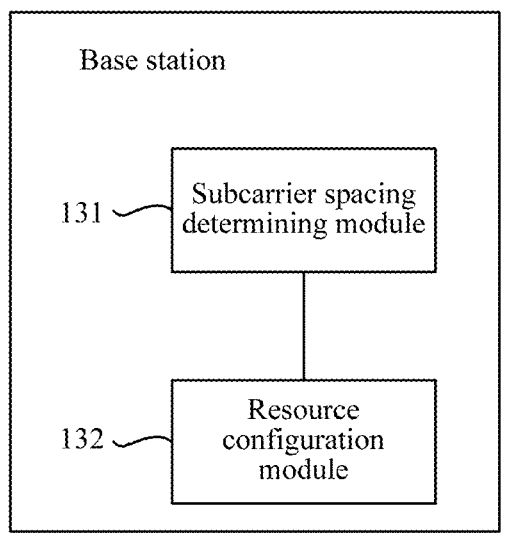
FIG. 13 to FIG. 15 are structural block diagrams of a base station according to embodiments of this application.

Referring to FIG. 13, an embodiment of this application provides a base station, which may be configured to perform the methods in the embodiments of this application. The base station includes a subcarrier spacing determining module 131 and a resource configuration module 132.

In an actual application, physical devices corresponding to the subcarrier spacing determining module 131 and the resource configuration module 132 may be the processor 101 in FIG. 10.

In one embodiment, the subcarrier spacing determining module 131 is configured to determine, based on mapping relationships between carrier bandwidths and subcarrier spacings, a first subcarrier spacing used for resource configuration in a first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing.

The resource configuration module 132 is configured to configure a resource for a terminal device based on the determined first subcarrier spacing.

In one embodiment, the first carrier bandwidth belongs to a first carrier bandwidth range, and a subcarrier spacing used for resource configuration in each carrier bandwidth included in the first carrier bandwidth range is the first subcarrier spacing.

In one embodiment, the first carrier bandwidth can support a plurality of subcarrier spacings, and the plurality of subcarrier spacings include the first subcarrier spacing.

Figure 14:
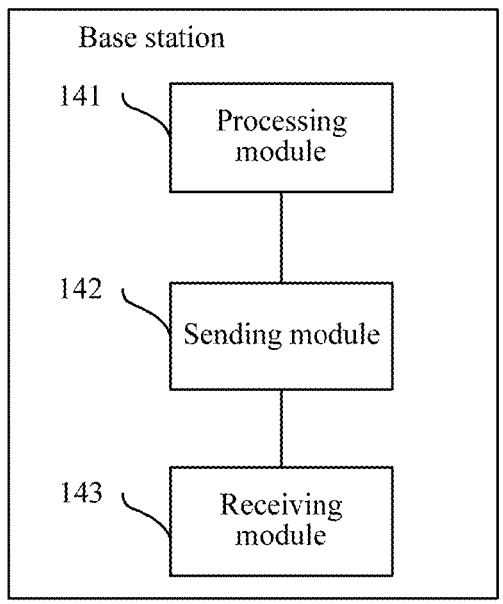

Referring to FIG. 14, an embodiment of this application provides a base station. The base station includes a processing module 141 and a sending module 142.

In an actual application, a physical device corresponding to the processing module 141 may be the processor 111 in FIG. 11, and a physical device corresponding to the sending module 142 may be the transmitter 112 in FIG. 11.

The processing module 141 is configured to determine a bandwidth part based on a mapping relationship between a first carrier bandwidth and a first bandwidth part set and/or a mapping relationship between a capability bandwidth of a terminal device and a second bandwidth part set.

The first bandwidth part set includes a plurality of bandwidth parts, the first bandwidth part set includes the determined bandwidth part, the second bandwidth part set includes a plurality of bandwidth parts, and the second bandwidth part set includes the determined bandwidth part.

The sending module 142 is configured to send first indication information to the terminal device, where the first indication information is used to indicate the determined bandwidth part.

In one embodiment, the base station further includes:

a receiving module 143, configured to receive second indication information sent by the terminal device, where the second indication information is used to indicate the capability bandwidth of the terminal device.

In one embodiment, the processing module 141 is configured to:

determine the bandwidth part in the first bandwidth part set, where the bandwidth part is less than or equal to the capability bandwidth of the terminal device.

In one embodiment, the processing module 141 is configured to:

determine any bandwidth part in the second bandwidth part set as the bandwidth part.

In one embodiment, the sending module 142 is further configured to:

send third indication information to the terminal device, where the third indication information is used to indicate a frequency domain position of the bandwidth part in the first carrier bandwidth to the terminal device, and the determined bandwidth part includes one or more bandwidth part units; and send fourth indication information to the terminal device, where the fourth indication information is used to indicate a frequency domain position of a scheduled physical resource block in the bandwidth part.

In one embodiment, the bandwidth part unit is a RBG, a SS bandwidth, or a PRB.

In one embodiment, the third indication information is carried on a resource in a common search space of a control channel or a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space. The sending module 142 is configured to:

send, in a first time domain position, the third indication information to the terminal device by using the control channel.

After the sending module sends the third indication information, the sending module 142 is further configured to:

send, in a second time domain position, data to the terminal device by using the determined bandwidth part.

In one embodiment, the first time domain position and the second time domain position belong to one scheduling unit in time domain, and the last OFDM symbol included in the first time domain position and the first OFDM symbol included in the second time domain position are separated by M OFDM symbols, where M is an integer greater than or equal to 1.

In one embodiment, the processing module 141 is further configured to:

determine, based on mapping relationships between carrier bandwidths and subcarrier spacings, a first subcarrier spacing used for resource configuration in the first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, and the first subcarrier spacing is different from the second subcarrier spacing; and determine, based on the determined first subcarrier spacing, the frequency domain position of the determined bandwidth part in the first carrier bandwidth.

In one embodiment, the first carrier bandwidth belongs to a first carrier bandwidth range, and a subcarrier spacing used for resource configuration in each carrier bandwidth included in the first carrier bandwidth range is the first subcarrier spacing.

In one embodiment, the first carrier bandwidth can support a plurality of subcarrier spacings, and the plurality of subcarrier spacings include the first subcarrier spacing.

Figure 15:
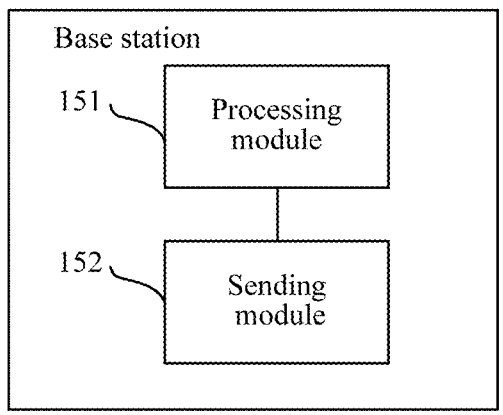

Referring to FIG. 15, an embodiment of this application provides a base station. The device includes a processing module 151 and a sending module 152.

In an actual application, a physical device corresponding to the processing module 151 may be the processor 121 in FIG. 12, and a physical device corresponding to the sending module 152 may be the transmitter 122 in FIG. 12.

The processing module 151 is configured to generate first indication information and second indication information, where the first indication information is used to indicate a frequency domain position, in a first carrier bandwidth, of a bandwidth part determined by the base station to the terminal device, the bandwidth part includes a plurality of bandwidth part units, and the second indication information is used to indicate a frequency domain position of a scheduled physical resource block in the bandwidth part.

The sending module 152 is configured to send the first indication information and the second indication information to the terminal device.

In one embodiment, the bandwidth part unit is a RBG, a SS bandwidth, or a PRB.

In one embodiment, the first indication information is carried on a resource in a common search space of a control channel or a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space. The sending module 152 is configured to:

send, in a first time domain position, the first indication information to the terminal device by using the control channel.

After the sending module sends the first indication information, the sending module 152 is further configured to:

send, in a second time domain position, data to the terminal device by using the determined bandwidth part.

In this embodiment of this application, the first time domain position and the second time domain position belong to one scheduling unit in time domain, and the last OFDM symbol included in the first time domain position and the first OFDM symbol included in the second time domain position are separated by M OFDM symbols, where M is an integer greater than or equal to 1.

Figure 16:
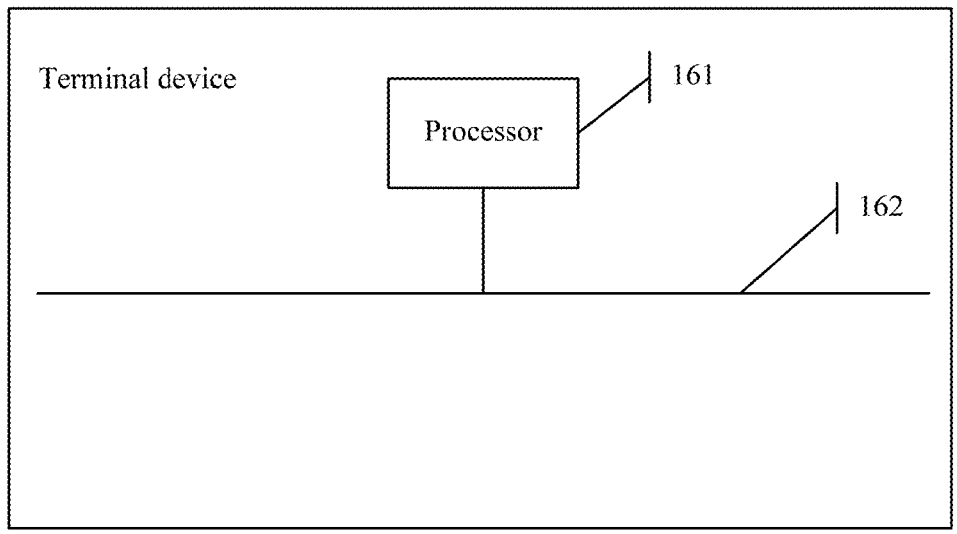
FIG. 16 to FIG. 18 are schematic structural diagrams of a terminal device according to embodiments of this application.

Referring to FIG. 16, an embodiment of this application provides a terminal device. The device includes a processor 161.

The processor 161 may be a central processing unit (CPU), an application-specific integrated circuit (ASIC), one or more integrated circuits configured to control program execution, a baseband chip, or the like.

The device may further include a memory. The memory may be connected to the processor 161 by using a bus 162. There may be one or more memories. The memory may be a read-only memory (ROM), a random access memory (RAM), a magnetic disk memory, or the like.

The processor 161 is configured to: determine, based on mapping relationships between carrier bandwidths and subcarrier spacings, a first subcarrier spacing used for resource configuration in a first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, the first subcarrier spacing is different from the second subcarrier spacing, and the first carrier bandwidth is a carrier bandwidth indicated by a base station to the terminal device; and determine, based on the determined first subcarrier spacing, a position of a resource allocated by the base station to the terminal device.

In one embodiment, the first carrier bandwidth belongs to a first carrier bandwidth range, and a subcarrier spacing used for resource configuration in each carrier bandwidth included in the first carrier bandwidth range is the first subcarrier spacing.

In one embodiment, the first carrier bandwidth can support a plurality of subcarrier spacings, and the plurality of subcarrier spacings include the first subcarrier spacing.

Code corresponding to the foregoing resource configuration method is burned into a chip by designing and programming the processor 161, so that the chip can perform the foregoing resource configuration method during operation. How to design and program the processor 161 is a technology known to a person skilled in the art, and details are not described herein.

Figure 17:
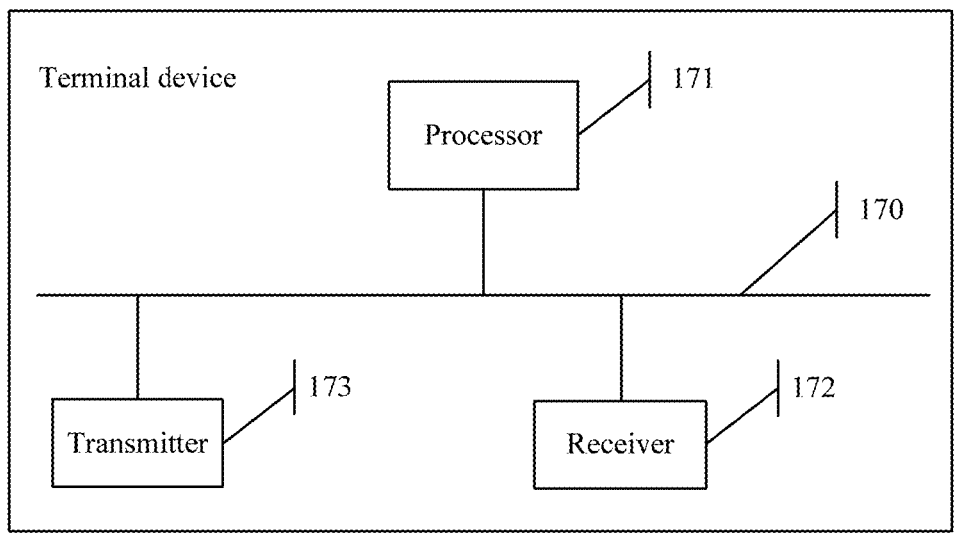

Referring to FIG. 17, an embodiment of this application provides a terminal device. The device includes a processor 171 and a receiver 172 connected to a same bus 170.

The processor 171 may be a central processing unit (CPU), an application-specific integrated circuit (ASIC), one or more integrated circuits configured to control program execution, a baseband chip, or the like.

The receiver 172 may be connected to the processor 171 by using the bus 170 (as shown in FIG. 17), or may be connected to the processor 171 by using a special connection cable.

The device may further include a memory. The memory may be connected to the processor 171 by using a bus 170. There may be one or more memories. The memory may be a read-only memory (ROM), a random access memory (RAM), a magnetic disk memory, or the like.

The receiver 172 is configured to receive first indication information sent by a base station, where the first indication information is used to indicate a bandwidth part determined by the base station, and the bandwidth part determined by the base station is determined by the base station based on a mapping relationship between a first carrier bandwidth and a first bandwidth part set and/or a mapping relationship between a capability bandwidth of the terminal device and a second bandwidth part set, where the first bandwidth part set includes a plurality of bandwidth parts, the first bandwidth part set includes the bandwidth part determined by the base station, the second bandwidth part set includes a plurality of bandwidth parts, and the second bandwidth part set includes the bandwidth part determined by the base station.

The processor 171 is configured to determine, according to the first indication information, the bandwidth part determined by the base station.

In this embodiment of this application, the terminal device further includes:

a transmitter 173, configured to: before the receiver 172 receives the first indication information, send, to the base station, second indication information used to indicate the capability bandwidth of the terminal device.

In this embodiment of this application, the first indication information includes third indication information and fourth indication information, and that the receiver 172 receives first indication information includes:

receiving, by the receiver 172, the third indication information sent by the base station, where the third indication information is used to indicate a frequency domain position, in the first carrier bandwidth, of the bandwidth part determined by the base station, and the bandwidth part determined by the base station includes a plurality of bandwidth part units; and receiving, by the receiver 172, the fourth indication information sent by the base station, where the fourth indication information is used to indicate a position of a scheduled physical resource block in the determined bandwidth part.

In this embodiment of this application, the bandwidth part unit is a RBG, a SS bandwidth, or a PRB.

In this embodiment of this application, the third indication information is carried on a resource in a common search space of a control channel or a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space. The receiver 172 is configured to:

receive, in a first time domain position by using the control channel, the third indication information sent by the base station.

After receiving the third indication information, the receiver 172 is further configured to:

receive, in a second time domain position by using a data channel, data sent by the base station.

In this embodiment of this application, the first time domain position and the second time domain position belong to one scheduling unit in time domain, and the last OFDM symbol included in the first time domain position and the first OFDM symbol included in the second time domain position are separated by M OFDM symbols, where M is an integer greater than or equal to 1.

In one embodiment, the processor 171 is further configured to:

determine, based on mapping relationships between carrier bandwidths and subcarrier spacings, a first subcarrier spacing used for resource configuration in the first carrier bandwidth, where the mapping relationships include a mapping relationship between the first carrier bandwidth and the first subcarrier spacing and a mapping relationship between a second carrier bandwidth and a second subcarrier spacing, and the first subcarrier spacing is different from the second subcarrier spacing; and determine, based on the determined first subcarrier spacing, the frequency domain position of the determined bandwidth part in the first carrier bandwidth.

In one embodiment, the first carrier bandwidth belongs to a first carrier bandwidth range, and a subcarrier spacing used for resource configuration in each carrier bandwidth included in the first carrier bandwidth range is the first subcarrier spacing.

In this embodiment of this application, the first carrier bandwidth can support a plurality of subcarrier spacings, and the plurality of subcarrier spacings include the first subcarrier spacing.

Figure 18:
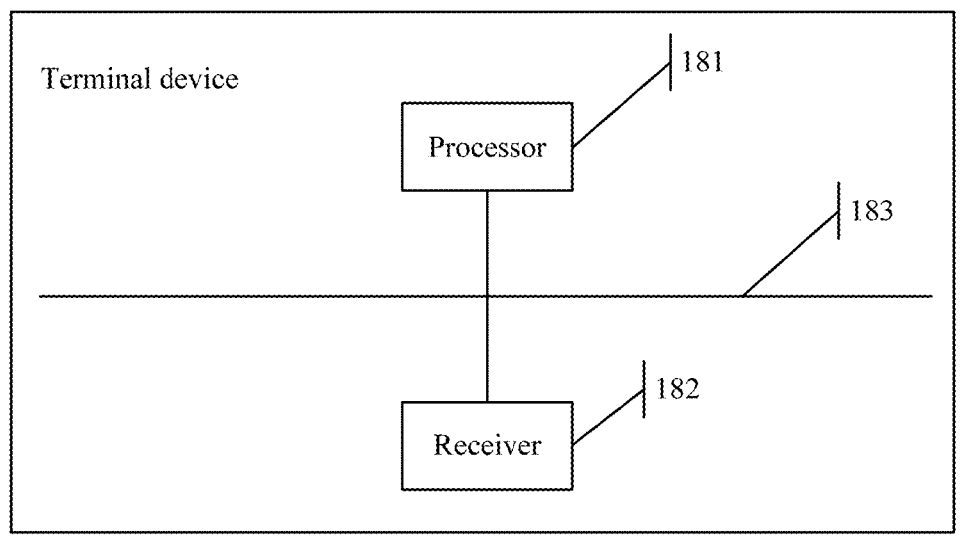

Referring to FIG. 18, an embodiment of this application provides a terminal device. The device includes a processor 181 and a receiver 182.

The device may further include a memory. The memory may be connected to the processor 181 by using a bus 183. There may be one or more memories. The memory may be a read-only memory (ROM), a random access memory (RAM), a magnetic disk memory, or the like.

The receiver 182 is configured to receive first indication information sent by a base station, where the first indication information is used to indicate, to the terminal device, a frequency domain position of a determined bandwidth part in a first carrier bandwidth of the base station, and the bandwidth part includes a plurality of bandwidth part units.

The receiver 182 is further configured to receive second indication information sent by the base station, where the second indication information is used to indicate a frequency domain position of a scheduled physical resource block in the bandwidth part.

The processor 181 is configured to determine, according to the first indication information, the frequency domain position of the bandwidth part in the first carrier bandwidth of the base station.

The processor 181 is further configured to determine, according to the second indication information, a frequency domain position, in the bandwidth part, of a physical resource block used by the base station to transmit data to the terminal device.

In one embodiment, the bandwidth part unit is a RBG, a SS bandwidth, or a PRB.

In one embodiment, the first indication information is carried on a resource in a common search space of a control channel or on a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space. The receiver 182 is configured to:

receive, in a first time domain position by using the control channel, the first indication information sent by the base station.

After receiving the first indication information, the receiver 182 is further configured to:

receive, in a second time domain position by using a data channel, data sent by the base station.

In this embodiment of this application, the first time domain position and the second time domain position belong to one scheduling unit in time domain, and the last OFDM symbol included in the first time domain position and the first OFDM symbol included in the second time domain position are separated by M OFDM symbols, where M is an integer greater than or equal to 1.

Figure 19:
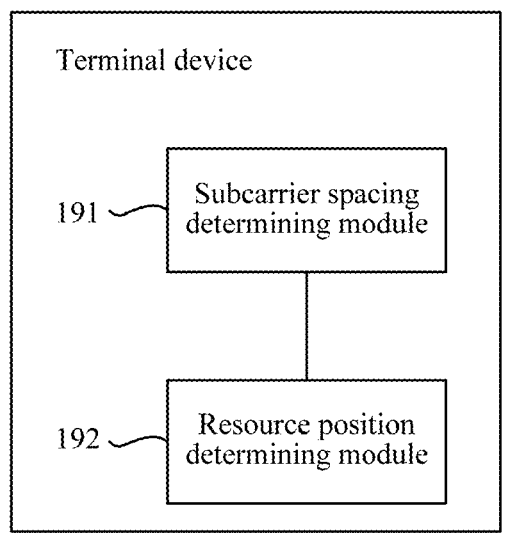
FIG. 19 to FIG. 21 are structural block diagrams of a terminal device according to embodiments of this application.

Referring to FIG. 19, an embodiment of this application provides a terminal device. The device includes a subcarrier spacing determining module 191 and a resource position determining module 192.

In an actual application, physical devices corresponding to the subcarrier spacing determining module 191 and the resource position determining module 192 may be the processor 161 in FIG. 16.

In one embodiment, the subcarrier spacing determining module 191 is configured to determine, based on mapping relationships between carrier bandwidths and subcarrier spacings, a first subcarrier spacing used for resource configuration in a first carrier bandwidth, where the mapping relationships between carrier bandwidths and subcarrier spacings include a mapping relationship between the first carrier bandwidth and the first subcarrier spacing and a mapping relationship between a second carrier bandwidth and a second subcarrier spacing, the first subcarrier spacing is different from the second subcarrier spacing, and the first carrier bandwidth is a carrier bandwidth indicated by a base station to the terminal device.

The resource position determining module 192 is configured to determine, based on the determined first subcarrier spacing, a position of a resource allocated by the base station to the terminal device.

In one embodiment, the first carrier bandwidth belongs to a first carrier bandwidth range, and a subcarrier spacing used for resource configuration in each carrier bandwidth included in the first carrier bandwidth range is the first subcarrier spacing.

In one embodiment, the first carrier bandwidth can support a plurality of subcarrier spacings, and the plurality of subcarrier spacings include the first subcarrier spacing.

Figure 20:
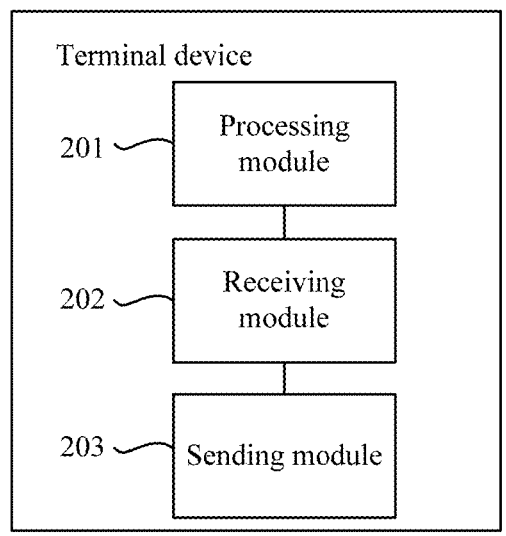

Referring to FIG. 20, an embodiment of this application provides a terminal device. The device includes a processing module 201 and a receiving module 202.

In an actual application, a physical device corresponding to the processing module 201 may be the processor 171 in FIG. 17, and a physical device corresponding to the receiving module 202 may be the receiver 172 in FIG. 17.

The receiving module 202 is configured to receive first indication information sent by a base station, where the first indication information is used to indicate a bandwidth part determined by the base station, and the bandwidth part determined by the base station is determined by the base station based on a mapping relationship between a first carrier bandwidth and a first bandwidth part set and/or a mapping relationship between a capability bandwidth of the terminal device and a second bandwidth part set, where the first bandwidth part set includes a plurality of bandwidth parts, the first bandwidth part set includes the bandwidth part determined by the base station, the second bandwidth part set includes a plurality of bandwidth parts, and the second bandwidth part set includes the bandwidth part determined by the base station.

The processing module 201 is configured to determine, according to the first indication information, the bandwidth part determined by the base station.

In one embodiment, the terminal device further includes:

a sending module 203, configured to: before the receiving module 202 receives the first indication information, send, to the base station, second indication information used to indicate the capability bandwidth of the terminal device.

In one embodiment, the first indication information includes third indication information and fourth indication information, and that the receiving module 202 receives first indication information includes:

receiving, by the receiving module 202, the third indication information sent by the base station, where the third indication information is used to indicate a frequency domain position, in the first carrier bandwidth, of the bandwidth part determined by the base station, and the bandwidth part determined by the base station includes a plurality of bandwidth part units; and receiving, by the receiving module 202, the fourth indication information sent by the base station, where the fourth indication information is used to indicate a position of a scheduled physical resource block in the determined bandwidth part.

In this embodiment of this application, the bandwidth part unit is a RBG, a SS bandwidth, or a PRB.

In this embodiment of this application, the third indication information is carried on a resource in a common search space of a control channel or a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space. The receiving module 202 is configured to:

receive, in a first time domain position by using the control channel, the third indication information sent by the base station.

After receiving the third indication information, the receiving module 202 is further configured to:

receive, in a second time domain position by using the determined bandwidth part, data sent by the base station.

In this embodiment of this application, the first time domain position and the second time domain position belong to one scheduling unit in time domain, and the last OFDM symbol included in the first time domain position and the first OFDM symbol included in the second time domain position are separated by M OFDM symbols, where M is an integer greater than or equal to 1.

In one embodiment, the processing module 201 is further configured to:

determine, based on mapping relationships between carrier bandwidths and subcarrier spacings, a first subcarrier spacing used for resource configuration in the first carrier bandwidth, where the mapping relationships include a mapping relationship between the first carrier bandwidth and the first subcarrier spacing and a mapping relationship between a second carrier bandwidth and a second subcarrier spacing, and the first subcarrier spacing is different from the second subcarrier spacing; and determine, based on the determined first subcarrier spacing, the frequency domain position of the determined bandwidth part in the first carrier bandwidth.

In one embodiment, the first carrier bandwidth belongs to a first carrier bandwidth range, and a subcarrier spacing used for resource configuration in each carrier bandwidth included in the first carrier bandwidth range is the first subcarrier spacing.

In one embodiment, the first carrier bandwidth can support a plurality of subcarrier spacings, and the plurality of subcarrier spacings include the first subcarrier spacing.

Figure 21:
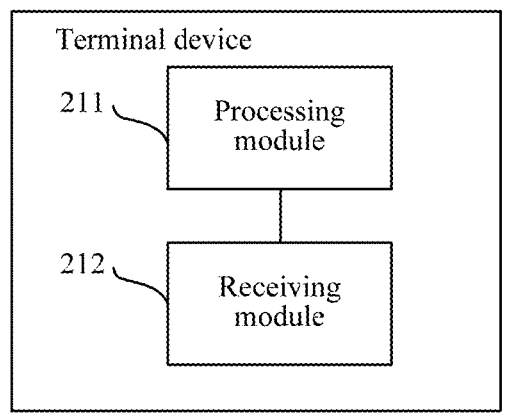

Referring to FIG. 21, an embodiment of this application provides a terminal device. The device includes a processing module 211 and a receiving module 212.

In an actual application, a physical device corresponding to the processing module 211 may be the processor 181 in FIG. 18, and a physical device corresponding to the receiving module 212 may be the receiver 182 in FIG. 18.

The receiving module 212 is configured to receive first indication information sent by a base station, where the first indication information is used to indicate, to the terminal device, a frequency domain position of a determined bandwidth part in a first carrier bandwidth of the base station, and the bandwidth part includes a plurality of bandwidth part units.

The receiving module 212 is further configured to receive second indication information sent by the base station, where the second indication information is used to indicate a frequency domain position of a scheduled physical resource block in the bandwidth part.

The processing module 211 is configured to determine, according to the first indication information, the frequency domain position of the bandwidth part in the first carrier bandwidth of the base station.

The processing module 211 is further configured to determine, according to the second indication information, a frequency domain position, in the bandwidth part, of a physical resource block used by the base station to transmit data to the terminal device.

In one embodiment, the bandwidth part unit is a resource RBG, a SS bandwidth, or a PRB.

In one embodiment, the first indication information is carried on a resource in a common search space of a control channel or on a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space. The receiving module 212 is configured to:

receive, in a first time domain position by using the control channel, the first indication information sent by the base station.

After receiving the first indication information, the receiving module 212 is further configured to:

receive, in a second time domain position by using the determined bandwidth part, data sent by the base station.

In one embodiment, the first time domain position and the second time domain position belong to one scheduling unit in time domain, and the last OFDM symbol included in the first time domain position and the first OFDM symbol included in the second time domain position are separated by M OFDM symbols, where M is an integer greater than or equal to 1.

Figure 22:
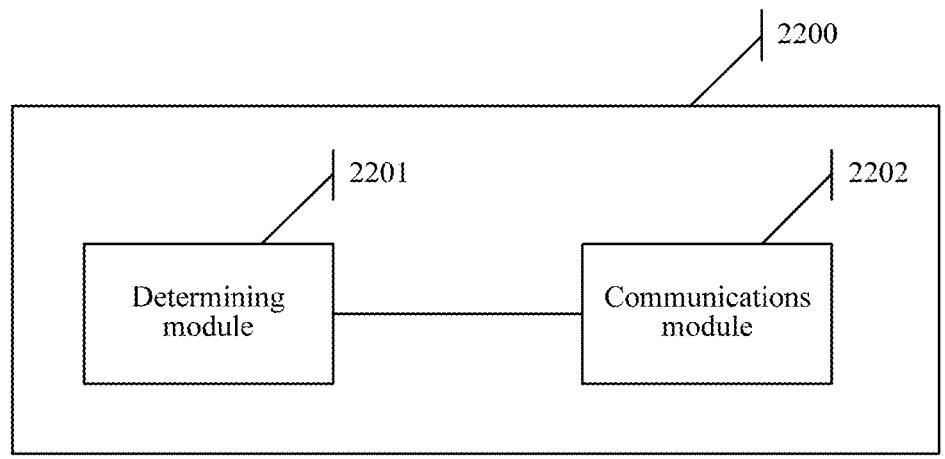
FIG. 22 to FIG. 25 are schematic structural diagrams of an apparatus according to embodiments of this application.

FIG. 22 is a schematic structural diagram of an apparatus 2200. The apparatus 2200 may be a base station that can implement a function of the base station in the methods provided in the embodiments of this application, or the apparatus 2200 may be an apparatus that can support a base station in implementing a function of the base station in the methods provided in the embodiments of this application. The apparatus 2200 may be a hardware structure, a software module, or a hardware structure plus a software module. The apparatus 2200 may be implemented by a chip system. In this embodiment of this application, the chip system may include a chip, or may include a chip and other discrete devices.

The apparatus 2200 may include a determining module 2201 and a communications module 2202.

The determining module 2201 and the communications module 2202 may be configured to perform the method in the embodiment shown in FIG. 4 or FIG. 9, and/or is configured to support another process in a technology described in this specification.

For example, the determining module 2201 may be configured to determine, based on mapping relationships between carrier bandwidths and subcarrier spacings, a first subcarrier spacing used for resource configuration in a first carrier bandwidth, and the communications module 2202 may be configured to configure a resource for a terminal device based on the determined first subcarrier spacing. Alternatively the determining module 2201 may be configured to determine a bandwidth part based on a mapping relationship between a first carrier bandwidth and a first bandwidth part set and/or a mapping relationship between a capability bandwidth of a terminal device and a second bandwidth part set, and the communications module 2202 may be configured to send the first indication information, where the first indication information is used to indicate the determined bandwidth part. Alternatively the determining module 2201 may be configured to determine a bandwidth part configured for a terminal device, and the communications module 2202 may be configured to send first indication information and second indication information, where the first indication information is used to indicate a frequency domain position of the determined bandwidth part in a first carrier bandwidth to the terminal device, the determined bandwidth part includes one or more of bandwidth part units, and the second indication information is used to indicate a frequency domain position of a scheduled physical resource block in the determined bandwidth part.

The communications module 2201 is used by the apparatus 2200 to communicate with another module, and the communications module 2201 may be a circuit, a device, an interface, a bus, a software module, a transceiver, or any other apparatus that can implement communication.

All related content of the operations in the foregoing method embodiments may be referred for the functional descriptions of the corresponding functional modules. Details are not described herein again.

Figure 23:
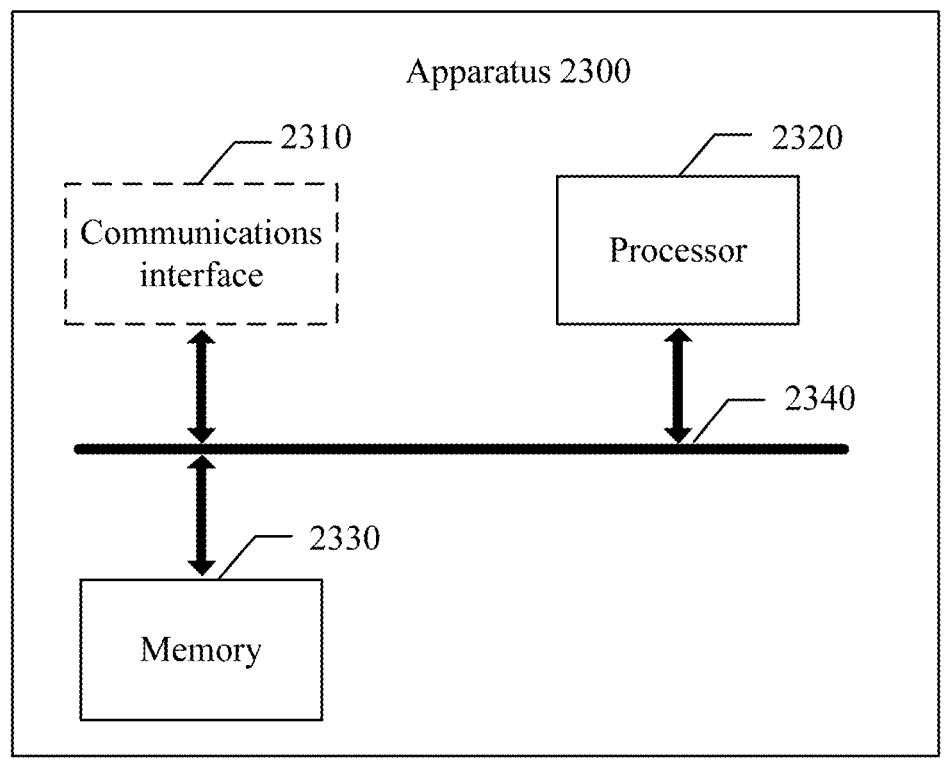

FIG. 23 shows an apparatus 2300 according to an embodiment of this application. The apparatus 2300 may be a base station that can implement a function of the base station in the methods provided in the embodiments of this application, or the apparatus 2300 may be an apparatus that can support a base station in implementing a function of the base station in the methods provided in the embodiments of this application. The apparatus 2300 may be a chip system.

The apparatus 2300 includes at least one processor 2320, configured to implement or support the apparatus 2300 in implementing a function of the base station in the methods provided in the embodiments of this application. For example, the processor 2320 may determine a first subcarrier spacing used for resource configuration and configure a resource for a terminal device based on the determined first subcarrier spacing. The processor 2320 may be configured to determine, based on a mapping relationship between a first carrier bandwidth and a first bandwidth part set and/or a mapping relationship between a capability bandwidth of a terminal device and a second bandwidth part set, a bandwidth part configured for the terminal device. The processor 2320 may generate first indication information and second indication information, where the first indication information is used to indicate a frequency domain position, in a first carrier bandwidth, of a bandwidth part configured for the terminal device, the bandwidth part includes a plurality of bandwidth part units, and the second indication information is used to indicate a frequency domain position of a scheduled physical resource block in the bandwidth part. For details, refer to descriptions in the method examples, and details are not described herein again.

The apparatus 2300 may further include at least one memory 2330, configured to store a program instruction and/or data. The memory 2330 is coupled with the processor 2320. The coupling in this embodiment of this application is indirect coupling or communication connection between apparatuses, units, or modules, may be implemented in an electrical, mechanical, or another form, and is used for information exchange between the apparatuses, units, or modules. The processor 2320 may cooperate with the memory 2330. The processor 2320 may execute the program instruction stored in the memory 2330. At least one of the at least one memory may be included in the processor.

The apparatus 2300 may further include a communications interface 2310, configured to communicate with another device through a transmission medium, so that an component in the apparatus 2300 can communicate with the another device. The processor 2320 may send and receive data through the communications interface 2310.

This embodiment of this application is not limited to a connection medium among the communications interface 2310, the processor 2320, and the memory 2330. In this embodiment of this application, an example is used in which the memory 2330, the processor 2320, and the communications interface 2310 are connected by using a bus 2340 in FIG. 23. The bus is represented by using a bold line in FIG.

23, and a manner of a connection between other parts is merely used as an example, and is not limited thereto. The bus may be classified into an address bus, a data bus, a control bus, and the like. For ease of representation, only one thick line is used to represent the bus in FIG. 23, but this does not mean that there is only one bus or only one type of bus.

In the embodiments of this application, the processor may be a general processor, a digital signal processor, an application-specific integrated circuit, a field programmable gate array or another programmable logic device, a discrete gate or transistor logic device, or a discrete hardware component, and may implement or execute the methods, steps, operations, and logical block diagrams disclosed in the embodiments of this application. The universal processor may be a microprocessor or any conventional processor or the like. The operations of the methods disclosed with reference to the embodiments of this application may be directly performed by a hardware processor, or may be performed by using a combination of hardware in the processor and a software module.

In this embodiment of this application, the memory may be a non-volatile memory, for example, a hard disk drive (HDD) or a solid-state drive (SSD), or may be a volatile memory, for example, a random access memory (RAM). The memory is any other medium that can be configured to carry or store expected program code in a form of an instruction or a data structure and that is accessible by a computer, but is not limited thereto. The memory in this embodiment of this application may alternatively be a circuit or any other apparatus that can implement a storage function, to store the program instruction and/or the data.

Figure 24:
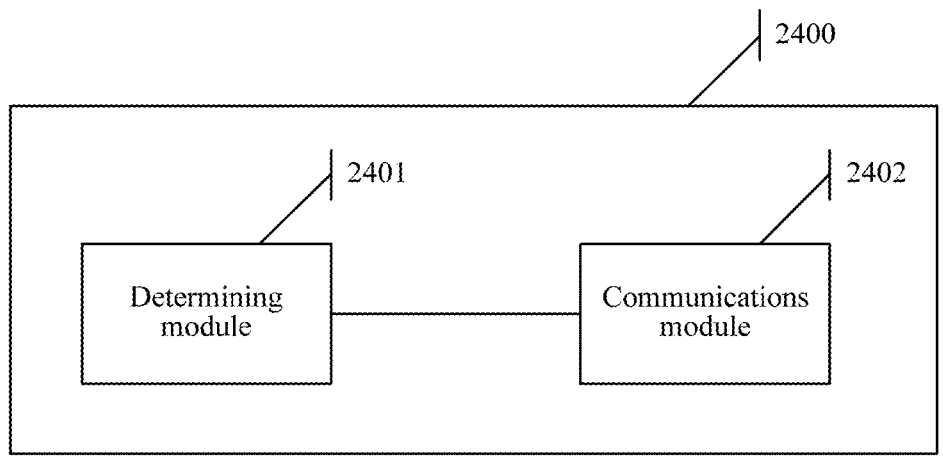

FIG. 24 is a schematic structural diagram of an apparatus 2400. The apparatus 2400 may be a terminal device that can implement a function of the terminal device in the methods provided in the embodiments of this application, or the apparatus 2400 may be an apparatus that can support a terminal device in implementing a function of the terminal device in the methods provided in the embodiments of this application. The apparatus 2400 may be a hardware structure, a software module, or a hardware structure plus a software module. The apparatus 2400 may be implemented by a chip system.

The apparatus 2400 may include a determining module 2401 and/or a communications module 2402.

The determining module 2401 may be configured to perform the method in the embodiment shown in FIG. 4 or FIG. 9, and/or is configured to support another process in a technology described in this specification.

For example, the determining module 2401 may be configured to: determine, based on mapping relationships between carrier bandwidths and subcarrier spacings, a first subcarrier spacing used for resource configuration in a first carrier bandwidth; and determine, based on the determined first subcarrier spacing, a position of a resource configured for a terminal device. Alternatively, the communications module 2402 is configured to receive first indication information, where the first indication information is used to indicate a bandwidth part configured for a terminal device, and the determining module 2401 is configured to determine, according to the first indication information, the bandwidth part configured for the terminal device. Alternatively, the communications module 2402 is configured to receive first indication information and second indication information, where the first indication information is used to indicate a frequency domain position, in a first carrier bandwidth, of a bandwidth part configured for a terminal device, the first carrier bandwidth is an indicated carrier bandwidth, the bandwidth part configured for the terminal device includes a plurality of bandwidth part units, and the second indication information is used to indicate a frequency domain position of a scheduled physical resource block in the bandwidth part configured for the terminal device; and the determining module 2401 is configured to determine, according to the first indication information and the second indication information, the bandwidth part configured for the terminal device.

The communications module 2402 is used by the apparatus 2400 to communicate with another module, and the communications module 2402 may be a circuit, a device, an interface, a bus, a software module, a transceiver, or any other apparatus that can implement communication.

All related content of the steps or operations in the foregoing method embodiments may be referred for the functional descriptions of the corresponding functional modules. Details are not described herein again.

Figure 25:
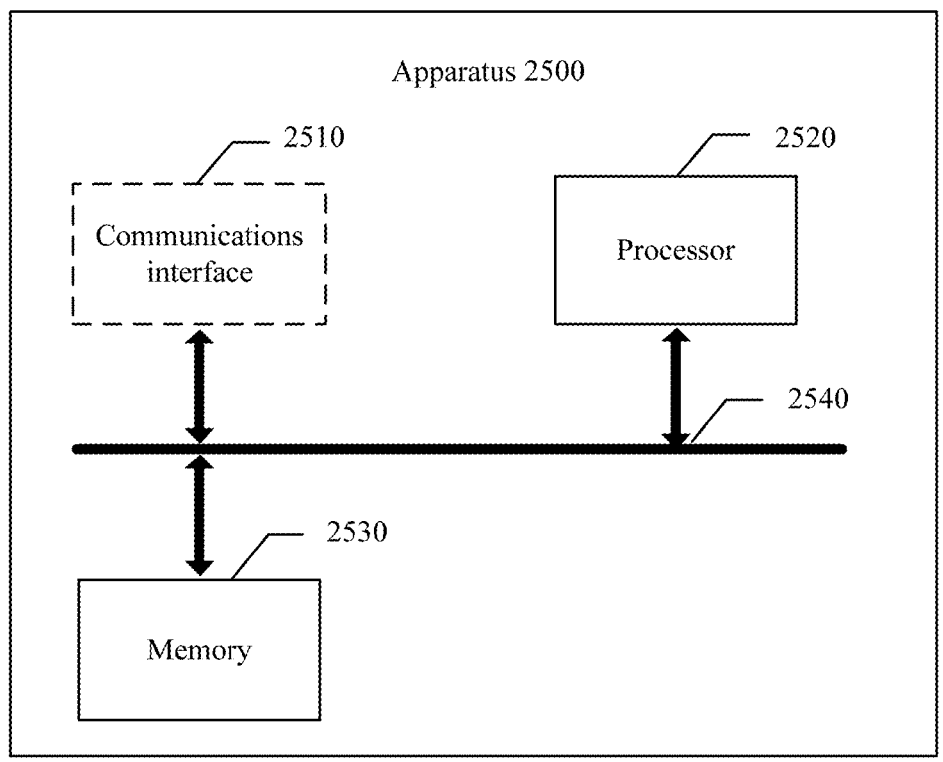

FIG. 25 shows an apparatus 2500 according to an embodiment of this application. The apparatus 2500 may be a terminal device that can implement a function of the terminal device in the methods provided in the embodiments of this application, or the apparatus 2500 may be an apparatus that can support a terminal device in implementing a function of the terminal device in the methods provided in the embodiments of this application. The apparatus 2500 may be a chip system.

The apparatus 2500 includes at least one processor 2520, configured to implement or support the apparatus 2500 in implementing a function of the terminal device in the methods provided in the embodiments of this application. For example, the processor 2520 may determine a first subcarrier spacing used for resource configuration and determine, based on the determined first subcarrier spacing, a position of a resource configured for the terminal device. Alternatively, the processor 2520 may determine, according to received first indication information, a bandwidth part configured for the terminal device. Alternatively, the processor 2520 may determine, according to receive first indication information and second indication information, a bandwidth part configured for the terminal device, where the first indication information is used to indicate a frequency domain position, in a first carrier bandwidth, of the bandwidth part configured for the terminal device, the first carrier bandwidth is an indicated carrier bandwidth, the bandwidth part configured for the terminal device includes a plurality of bandwidth part units, and the second indication information is used to indicate a frequency domain position of a scheduled physical resource block in the bandwidth part configured for the terminal device. For details, refer to descriptions in the method examples, and details are not described herein again.

The apparatus 2500 may further include at least one memory 2530, configured to store a program instruction and/or data. The memory 2530 is coupled with the processor 2520. The coupling in this embodiment of this application is indirect coupling or communication connection between apparatuses, units, or modules, may be implemented in an electrical, mechanical, or another form, and is used for information exchange between the apparatuses, units, or modules. The processor 2520 may cooperate with the memory 2530. The processor 2520 may execute the program instruction stored in the memory 2530. At least one of the at least one memory may be included in the processor.

The apparatus 2500 may further include a communications interface 2510, configured to communicate with another device through a transmission medium, so that an component in the apparatus 2500 can communicate with the another device. The processor 2520 may send and receive data through the communications interface 2510.

This embodiment of this application is not limited to a connection medium among the communications interface 2510, the processor 2520, and the memory 2530. In this embodiment of this application, an example is used in which the memory 2530, the processor 2520, and the communications interface 2510 are connected by using a bus 2540 in FIG. 25. The bus is represented by using a bold line in FIG. 25, and a manner of a connection between other parts is merely used as an example, and is not limited thereto. The bus may be classified into an address bus, a data bus, a control bus, and the like. For ease of representation, only one thick line is used to represent the bus in FIG. 25, but this does not mean that there is only one bus or only one type of bus.

It should be understood that, in the embodiments of this application, the base station in FIG. 10 to FIG. 15 and the apparatus in FIG. 22 and FIG. 23, and the terminal device in FIG. 16 to FIG. 21 and the apparatus in FIG. 24 and FIG. 25 may correspond to the base station and the terminal in the communication methods 400 and 900 in the embodiments of this application, and the foregoing and other operations and/or functions of the units in the base station and the terminal are separately intended to implement corresponding procedures of the methods in the embodiments of this application. For brevity, details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, modules and method steps or operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the embodiments of this application, the receiver, the transmitter, the receiving module, the sending module may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU), a network processor (NP), or a combination of a CPU and an NP. The processor may further include a hardware chip. The foregoing hardware chip may be an application-specific integrated circuit (ASIC), a programmable logic device (PLD), or a combination thereof. The foregoing PLD may be a complex programmable logic device (CPLD), a field-programmable logic gate array (FPGA), a generic array logic (GAL), or any combination thereof. The memory may include a volatile memory, for example, a random access memory (RAM). The memory may further include a non-volatile memory, for example, a read-only memory (ROM), a flash memory, a hard disk drive (HDD), or a solid-state drive (SSD). The memory may further include a combination of the foregoing memories.

In FIG. 10, FIG. 11, FIG. 12, and FIG. 13, a bus interface may further be included. The bus interface may include any quantity of interconnected buses and bridges. In one embodiment, various circuits of one or more processors represented by the processor and a memory represented by the memory are connected together. The bus interface may further link various other circuits of, for example, a peripheral device, a voltage regulator, and a power management circuit. All these are well known in the art, and therefore, are not further described in this specification. The bus interface provides an interface. The transceiver provides a unit configured to communicate with other various devices on a transmission medium. The processor is responsible for managing a bus architecture and common processing, and the memory may store data used when the processor performs an operation. All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive (SSD)), or the like. The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly; for related parts, refer to partial descriptions in the method embodiment.

In summary, it should be noted that what is described above is merely example embodiments of the technical solutions of this application, but is not intended to limit the protection scope of this application. Obviously, a person skilled in the art can make various modifications and variations to this application without departing from the scope of this application. Any modification, equivalent substitution, improvement, and the like shall be included in the protection scope of this application provided that they fall within the scope defined by the following claims and their equivalent technologies.

What is claimed is:

1. A method for determining a bandwidth part comprising:
   determining, by a base station, the bandwidth part based on a mapping relationship between a first carrier bandwidth and a first bandwidth part set or a mapping relationship between a capability bandwidth of a terminal device and a second bandwidth part set, wherein,
   the first bandwidth part set comprises a plurality of bandwidth parts, the first bandwidth part set comprises the determined bandwidth part, the second bandwidth part set comprises a plurality of bandwidth parts, and the second bandwidth part set comprises the determined bandwidth part; and
   sending, by the base station, first indication information to the terminal device, wherein the first indication information indicates the determined bandwidth part, and wherein the sending, by the base station, the first indication information to the terminal device further comprises sending, by the base station, third indication information to the terminal device, wherein the third indication information indicates a frequency domain position of the bandwidth part in the first carrier bandwidth to the terminal device, and the determined bandwidth part comprises one or more bandwidth part units.

2. The method according to claim 1, wherein the method further comprises:
   receiving, by the base station, second indication information from the terminal device, wherein the second indication information indicates the capability bandwidth of the terminal device.

3. The method according to claim 2, wherein the determining, by a base station, the bandwidth part based on a mapping relationship between a first carrier bandwidth and a first bandwidth part set comprises:
   determining, by the base station, the bandwidth part in the first bandwidth part set, wherein the bandwidth part is less than or equal to the capability bandwidth of the terminal device.

4. The method according to claim 2, wherein the determining, by a base station, the bandwidth part based on a mapping relationship between a capability bandwidth of a terminal device and a second bandwidth part set comprises:
   determining, by the base station, any bandwidth part in the second bandwidth part set as the bandwidth part.

5. The method according to claim 1, wherein the sending, by the base station, first indication information to the terminal device comprises:
   sending, by the base station, fourth indication information to the terminal device, wherein the fourth indication information indicates a frequency domain position of a scheduled physical resource block in the bandwidth part.

6. The method according to claim 5, wherein the bandwidth part unit includes a resource block group (RBG), a synchronization signal bandwidth (SS bandwidth), or a physical resource block (PRB).

7. The method according to claim 5, wherein the third indication information is carried on a resource in a common search space of a control channel or a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space; and the sending, by the base station, third indication information to the terminal device comprises:
   sending, by the base station in a first time domain position, the third indication information to the terminal device by using the control channel; and
   after the sending, by the base station, third indication information to the terminal device, the method further comprises:
   sending, by the base station in a second time domain position, data to the terminal device by using the determined bandwidth part.

8. The method according to claim 7, wherein the first time domain position and the second time domain position are in one scheduling unit in a time domain, and the last orthogonal frequency division multiplexing (OFDM) symbol comprised in the first time domain position and the first OFDM symbol comprised in the second time domain position are separated by M OFDM symbols, wherein M is an integer greater than or equal to 1.

9. The method according to claim 5, wherein before the sending, by the base station, first indication information to the terminal device, the method further comprises:
   determining, by the base station based on mapping relationships between carrier bandwidths and subcarrier spacings, a first subcarrier spacing used for resource configuration in the first carrier bandwidth, wherein the mapping relationships between carrier bandwidths and subcarrier spacings comprise a mapping relationship between the first carrier bandwidth and the first subcarrier spacing and a mapping relationship between a second carrier bandwidth and a second subcarrier spacing, and the first subcarrier spacing is different from the second subcarrier spacing; and
   determining, by the base station based on the determined first subcarrier spacing, the frequency domain position of the determined bandwidth part in the first carrier bandwidth.

10. The method according to claim 9, wherein the first carrier bandwidth belongs to a first carrier bandwidth range, and a subcarrier spacing used for resource configuration in each carrier bandwidth comprised in the first carrier bandwidth range is the first subcarrier spacing.

11. The method according to claim 9, wherein the first carrier bandwidth supports a plurality of subcarrier spacings, and the plurality of subcarrier spacings comprise the first subcarrier spacing.

12. A method for determining a bandwidth part comprising:
   receiving, by a terminal device, first indication information from a base station, wherein the first indication information indicates a bandwidth part determined by the base station, and the bandwidth part determined by the base station is determined by the base station based on a mapping relationship between a first carrier bandwidth and a first bandwidth part set or a mapping relationship between a capability bandwidth of the terminal device and a second bandwidth part set, wherein the first bandwidth part set comprises a plurality of bandwidth parts, the first bandwidth part set comprises the bandwidth part determined by the base station, the second bandwidth part set comprises a plurality of bandwidth parts, the second bandwidth part set comprises the bandwidth part determined by the base station, and the first carrier bandwidth is a carrier bandwidth indicated by the base station to the terminal device, wherein the first indication information sent by the base station further comprises third indication information from the base station, wherein the third indication information indicates a frequency domain position, in the first carrier bandwidth, of the bandwidth part determined by the base station, and the bandwidth part determined by the base station comprises one or more bandwidth part units; and determining, by the terminal device according to the first indication information, the bandwidth part determined by the base station.

13. The method according to claim 12, wherein before the receiving, by a terminal device, first indication information sent by a base station, the method further comprises:

sending, by the terminal device to the base station, second indication information used to indicate the capability bandwidth of the terminal device.

14. The method according to claim 12, wherein the receiving, by a terminal device, first indication information sent by a base station comprises:

receiving, by the terminal device, fourth indication information from the base station, wherein the fourth indication information indicates a frequency domain position of a scheduled physical resource block in the determined bandwidth part.

15. The method according to claim 14, wherein the bandwidth part unit is a resource block group (RBG), a synchronization signal bandwidth (SS bandwidth), or a physical resource block (PRB).

16. The method according to claim 14, wherein the third indication information is carried on a resource in a common search space of a control channel or a resource in a terminal device specific search space, the frequency domain position of the bandwidth part in the first carrier bandwidth does not overlap with a frequency domain position, in the first carrier bandwidth, of the resource in the common search space, and the frequency domain position of the bandwidth part in the first carrier bandwidth does not overlap with a frequency domain position, in the first carrier bandwidth, of the resource in the terminal device specific search space; and the receiving, by the terminal device, third indication information sent by the base station comprises:

receiving, by the terminal device in a first time domain position by using the control channel, the third indication information from the base station; and after the receiving, by the terminal device, third indication information sent by the base station, the method further comprises:

receiving, by the terminal device in a second time domain position by using the determined bandwidth part, data sent by the base station.

17. The method according to claim 16, wherein the first time domain position and the second time domain position are in one scheduling unit in a time domain, and the last orthogonal frequency division multiplexing (OFDM) symbol comprised in the first time domain position and the first OFDM symbol comprised in the second time domain position are separated by M OFDM symbols, wherein M is an integer greater than or equal to 1.

18. The method according to claim 12, wherein the method further comprises:

determining, by the terminal device based on mapping relationships between carrier bandwidths and subcarrier spacings, a first subcarrier spacing used for resource configuration in the first carrier bandwidth, wherein the mapping relationships comprise a mapping relationship between the first carrier bandwidth and the first subcarrier spacing and a mapping relationship between a second carrier bandwidth and a second subcarrier spacing, and the first subcarrier spacing is different from the second subcarrier spacing; and determining, by the terminal device based on the determined first subcarrier spacing, the frequency domain position, in the first carrier bandwidth, of the bandwidth part determined by the base station.

19. The method according to claim 18, wherein the first carrier bandwidth belongs to a first carrier bandwidth range, and a subcarrier spacing used for resource configuration in each carrier bandwidth comprised in the first carrier bandwidth range is the first subcarrier spacing.

20. A communications apparatus comprising:

a receiver, configured to receive first indication information sent by a base station, wherein the first indication information indicates a bandwidth part determined by the base station, and the bandwidth part determined by the base station is determined by the base station based on a mapping relationship between a first carrier bandwidth and a first bandwidth part set or a mapping relationship between a capability bandwidth of a terminal device and a second bandwidth part set, wherein the first bandwidth part set comprises a plurality of bandwidth parts, the first bandwidth part set comprises the bandwidth part determined by the base station, the second bandwidth part set comprises a plurality of bandwidth parts, and the second bandwidth part set comprises the bandwidth part determined by the base station, wherein the first indication information sent by the base station further comprises third indication information from the base station, wherein the third indication information indicates a frequency domain position, in the first carrier bandwidth, of the bandwidth part determined by the base station, and the bandwidth part determined by the base station comprises one or more bandwidth part units; and a processor, configured to determine, according to the first indication information, the bandwidth part determined by the base station.

* * * * *